United States Patent
Imada

(10) Patent No.: US 6,694,096 B1
(45) Date of Patent: Feb. 17, 2004

(54) IMAGE STABILIZATION CONTROL DEVICE FOR USE IN CAMERA SYSTEM OPTIONALLY INCLUDING OPTICAL CHARACTERISTICS MODIFYING CONVERTER

(75) Inventor: Shinji Imada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/014,050

(22) Filed: Jan. 27, 1998

(30) Foreign Application Priority Data

Jan. 28, 1997  (JP) .............................................. 9-027355

(51) Int. Cl.[7] .............................................. G03B 17/00
(52) U.S. Cl. .............................. 396/52; 396/55; 396/71
(58) Field of Search .............................. 396/52, 53, 54, 396/55, 71; 348/208; 359/557

(56) References Cited

U.S. PATENT DOCUMENTS

| 5,479,236 A | * 12/1995 | Tanaka ........................ 348/208 |
| 5,615,397 A | 3/1997 | Shiomi et al. ................. 396/55 |
| 6,091,448 A | 7/2000 | Washisu et al. ............. 348/208 |
| 6,392,696 B1 | 5/2002 | Onuki ......................... 348/208 |

FOREIGN PATENT DOCUMENTS

| JP | 05-134215 | 5/1993 |
| JP | 07-104338 | 4/1995 |
| JP | 07-191355 | 7/1995 |
| JP | 07-191360 | 7/1995 |

* cited by examiner

Primary Examiner—Russell Adams
Assistant Examiner—Arthur A Smith
(74) Attorney, Agent, or Firm—Fitzpatrick, Cella, Harper & Scinto

(57) ABSTRACT

A device for use in a camera system including a camera, an optical characteristics modifying converter, and an optical assembly having an image stabilizing unit for stabilizing an image in response to the output of a vibration sensor for detecting a shake in an apparatus includes activating means for activating the stabilization operation by the image stabilizing unit in response to a predetermined operation in a predetermined operation portion of the camera, a determining means for determining whether an optical characteristics modifying converter without image stabilization function is incorporated in the camera system, and decision means for deciding whether to perform an activating operation by the activating means based on a determination by the determining means. The operation of a image stabilizing unit is determined by the incorporation of the converter.

51 Claims, 19 Drawing Sheets

《VIEWED FROM ARROW 79C IN FIG. 11A》

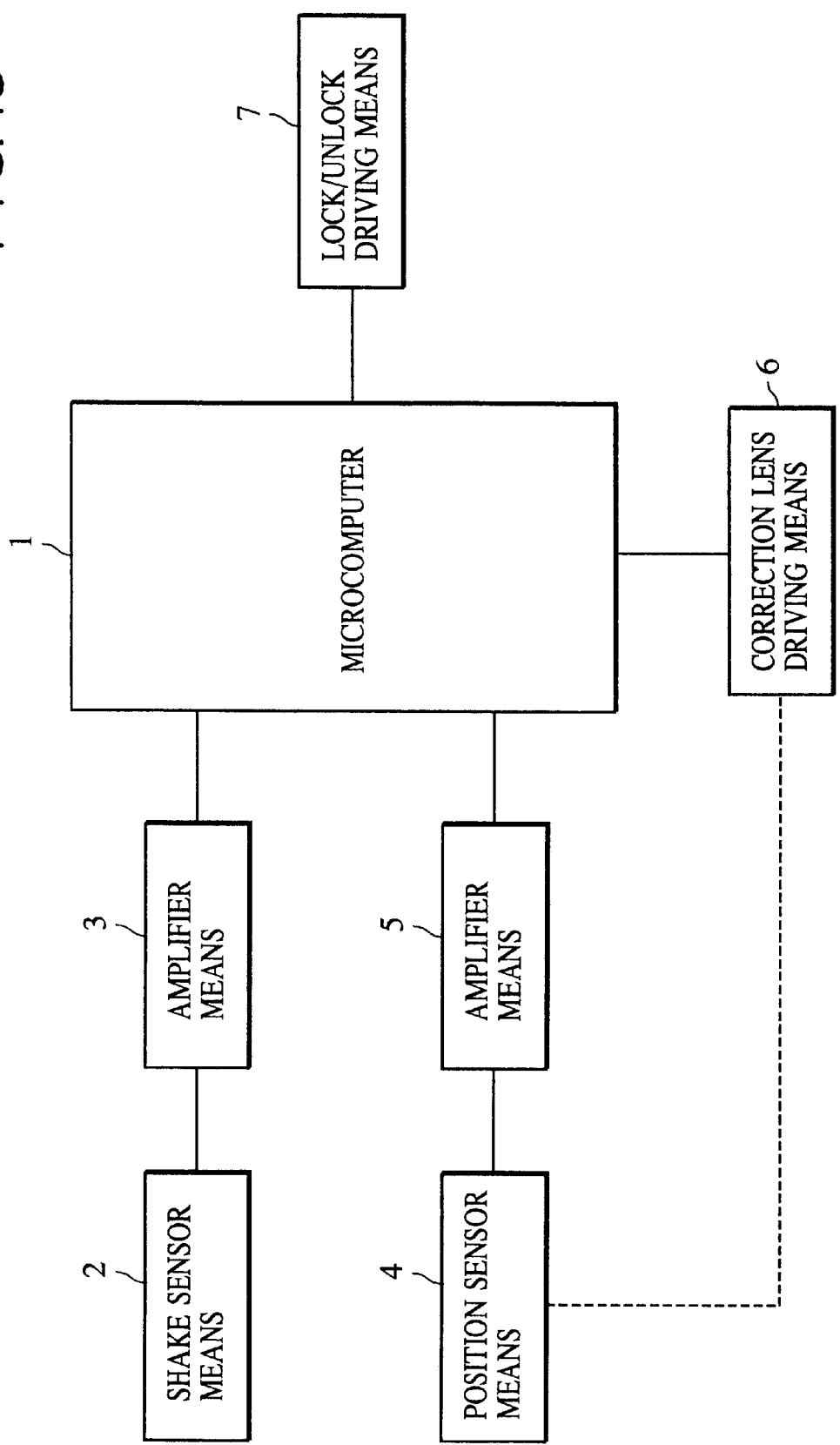

IMAGE STABILIZATION CONTROL DEVICE FOR USE IN CAMERA SYSTEM OPTIONALLY INCLUDING OPTICAL CHARACTERISTICS MODIFYING CONVERTER

BACKGROUND OF THE INVENTION

1. Field of the Invention

The present invention relates to a device for use in a camera system which includes an optical assembly having an image stabilizing unit for correcting image blur caused by shake in a camera or other optical apparatus.

2. Description of the Related Art

In cameras today, important settings including exposure and focus settings are all automated and even a person not familiar with camera operation is unlikely to fail to take a photograph.

Systems for preventing camera shake have been studied, and there are almost no factors that could cause a photographer to abort photographing.

Now a system for preventing camera shake is briefly discussed.

Camera shake during photographing is due to vibrations whose frequency falls within a range of 1 to 12 Hz. In order to photograph in image-blur free fashion even with camera shake at the moment of a shutter release, camera shake is detected and then a correction lens is displaced in response to the detected shake. To take a picture image-blur free, the camera shake needs to be accurately detected and variations in the optical axis of the camera need to be corrected accordingly.

Theoretically speaking, the vibration of a camera (camera-shake) is detected using vibration sensor means for detecting angular acceleration, angular velocity, angular displacement, the like, and camera shake sensor means that outputs angular displacement by electrically or mechanically integrating an output signal of the vibration sensor means. Image blur is thus, prevented by driving a correction optical system that decenters the optical axis of a photograph based on the information from these sensor mean.

The stabilization system using such vibration sensor means is now discussed referring to FIG. 8.

FIG. 8 shows the system for controlling image blur resulting from the vertical component 81$p$ and horizontal component 81$y$ of camera shake represented by arrows 81.

Shown in FIG. 8 are a lens barrel 82, and vibration sensor means 83$p$ and 83$y$ for detecting respectively the vertical component and horizontal component of the camera vibration; 84$p$ and 84$y$ denote respectively the directions of vibration. A correction optical assembly 85 (including coils 87$p$, 87$y$ for imparting thrust to the correction optical assembly 85 and position sensors 86$p$, 86$y$ for sensing the position of the correction optical assembly 85) is provided with a position control loop to be described later, and is driven with its target set to the output of the vibration sensor means 83$p$, 83$y$, thereby stabilizing an image on an image plane 88.

FIG. 9 is an exploded perspective view of an image stabilizing system (constructed of the vibration sensor means, the correction optical assembly, the coils, the position sensors and a variety of ICs) preferably used for the above purpose, and referring to FIGS. 9 through 18, the construction of the assembly is now discussed.

Rear projections 71$a$ (one of three projections 71 not shown) of a base plate 71 (see its enlarged view in FIG. 12) are engaged with the lens barrel, and known barrel rollers are screwed into holes 71$b$ to be secured to the lens barrel.

A glossily plated second yoke 72 of a magnetic material is secured to the base plate 71 by screws that pass through holes 72$a$ of the yoke 72 and are screwed into screw holes 71$c$ of the base plate 71. Permanent magnets (for shifting) 73 of neodymium or the like are magnetically attached to the second yoke 72. The direction of magnetization of each permanent magnet 73 is represented by an arrow 73$a$ as shown in FIG. 8.

A correction lens 74 is attached with a C ring to a support frame 75 (shown in an enlarged view in FIG. 13). Coils 76$p$, 76$y$ (shift coils) are forced to snap into place with the support frame 75 (the coils are not yet snapped in FIG. 13). Light emission devices (IRED) 77$p$, 77$y$ are glued onto the rear surface of the support frame 75. Light rays emitted therefrom pass through slits 75$ap$, 75$ay$ and reach position sensor devices (PSD) 78$p$, 78$y$.

Each of holes 75$b$ (at three positions) of the support frame 75 receives pins 79$a$, 79$b$, each having a spherical end and made of POM (polyacetal resin), and a bias spring 710 (as shown in FIGS. 10 and 12). The pin 79$a$ is thermally caulked to the support frame 75 (the pin 79$b$ is slidable in the direction of the hole 75$b$ against the urging of the bias spring 710).

FIG. 10 is a cross-sectional view showing the image stabilizing system after it is assembled. The pin 79$b$, the bias spring 710, and the pin 79$a$ in that order are inserted into the hole 75$b$ of the support frame 75 in the direction of an arrow 79$c$ (pins 79$a$, 79$b$ are identical in shape), and the circular end portion 75$c$ of the hole 75$b$ is thermally caulked to prevent the pin 79$a$ from coming off.

FIG. 11A is a cross-sectional view of the hole 75$b$ viewed perpendicular to the page of FIG. 10, and FIG. 11B is a front view of the hole 75$b$ viewed from the direction shown by the arrow 79$c$ in FIG. 11A. Reference characters A through D in FIG. 11B correspond to depths A through D in FIG. 11A.

The back end of a blade portion 79$aa$ of the pin 79$a$ is engaged with and restrained by a surface A, and the circular end 75$a$ is caulked, and the pin 79$a$ is secured to the support frame 75.

Since a blade portion 79$ba$ of the pin 79$b$ is engaged with an abutment surface B, the pin 79$b$ is prevented from coming out of the hole 75$b$ under the urging of the bias spring 710.

When image stabilizing system is fully assembled, the pin 79$b$ is engaged with the second yoke 72, and is thus prevented from coming out of the support frame 75. For convenience of assembling, the abutment surface B for locking purpose is provided.

As FIGS. 10 and 11 show the shapes of the support frame 75 and the holes 75$b$, the support frame 75 is manufactured using a simple split type molding technique in which a mold is simply pulled out in the direction of the arrow 79$c$, rather than a complex inner diameter slide molding technique, and accommodates high dimensional accuracy requirements.

The use of the pins 79$a$, 79$b$, identical to each other, reduces component cost, promotes error free assembling, and is advantageous from the component management point of view.

A shaft socket 75$d$ of the support frame 75 is coated with fluorine-based grease, and receives one end of an L-shaped shaft 711 (non-magnetic stainless steel) (see FIG. 9). The other end of the L-shaped shaft 711 is received in a shaft socket 71$d$ (similarly coated with the grease) formed in the base plate 71. With the three pins 79b resting on the second yoke 72, the support frame 75 is seated in the base plate 71.

As shown in FIG. 9, pins 71f (at three points) of the base plate 71 shown in FIG. 12 are received in alignment holes (at three points) 712a of a first yoke 712 shown in FIG. 9 while the first yoke 712 is engaged with abutment surfaces 71e (at five points) shown in FIG. 12 to be magnetically coupled to the base plate 71 (by means of magnetic force of the permanent magnets 73).

In this way the rear surface of the first yoke 712 is put into contact with the pins 79a, and the support frame 75 is interposed between the first yoke 712 and the second yoke 72 as shown in FIG. 10 so that the support frame 75 is registered in the direction of the optical axis of the camera.

The abutment surfaces of the first yoke 712 and the second yoke 72 and of the pins 79a, 79b mutually in contact are coated with fluorine-based grease, and the support frame 75 is slidably moved relative to the base plate 71 in a plane perpendicular to the optical axis.

The L-shaped shaft 711 permits the support frame 75 to be slidably supported relative to the base plate 71 in the directions shown by the arrows 713p, 713y only, thereby restraining a relative rotation (rolling) of the support frame 75 around the optical axis relative to the base plate 71.

The looseness permitted between the L-shaped shaft 711 and the shaft sockets 71d, 75d are set to be large in the direction of the optical axis so that the shaft sockets 71d, 75d may not override the restraint in the direction of the optical axis on the support frame 75 provided by the pins 79a, 79b interposed between the first yoke 712 and second yoke 72.

The first yoke 712 is covered with an insulating sheet 714. Mounted on the insulating sheet covered yoke 712 is a hard circuit board 715 (bearing the position sensor devices 78p, 78y, an amplifier IC, driving ICs for coils 76p, 76y) with its alignment holes 715b allowing pins 71h (at two points) of the base plate 71 to pass therethrough. At the same time, holes 715b of the circuit board 715 and holes 712b of the first yoke 712 are aligned and secured with holes 71g of the base plate 71 with screws.

The position sensors 78p, 78y are soldered to the hard circuit board 715 with the sensors aligned on the hard circuit board 715 with an instrument, and a flexible circuit board 716 is thermally bonded to the hard circuit board 715 with the surface 716a of the board 716 interfaced to the area 715c (see FIG. 9) of the rear side of the hard circuit board 715.

A pair of arms 716bp, 716by are extended from the flexible circuit board 716 in a plane perpendicular to the optical axis, and are engaged with lock portions 75eb, 75ey (see FIG. 13) of the support frame 75, and the terminals of the light emission devices 77p, 77y and the terminals of coils 76p, 76y are soldered to them.

The light emission devices 77p, 77y of IRED and coils 76p, 76y are driven by the hard circuit board 715 via the flexible circuit board 716.

The arms 716bp, 716by (FIG. 9) of the flexible circuit board 716 have respectively bent portions 716cp, 716cy. With their elasticity, the bent portions 716cp, 716cy lessen the load imposed on the arms 716bp, 716by when the support frame 75 moves in a plane perpendicular to the optical axis.

The first yoke 712 has elevated faces 712c formed through die cutting. The elevated faces 712c are directly put into contact with the hard circuit board 715 through notches 714a of the insulating sheet 714. The hard circuit board 715 has a ground trace on its surface in contact with the elevated faces 712c. By connecting the hard circuit board 715 to the base plate with screws, the first yoke 712 is grounded and is prevented from serving as an antenna which could pick up noise for the hard circuit board 715.

The mask 717 shown in FIG. 9 is aligned relative to the base plate 71 by pins 71h, and is affixed to the hard circuit board 715 using two-sided adhesive tape.

The base plate 71 is provided with a cutout 71i for a permanent magnet (see FIGS. 9 and 12), and the rear surface of the second yoke 72 is seen through the cutout 71i. A permanent magnet 718 (for locking) is assembled through the cutout 71i, and is magnetically coupled with the second yoke 72 (FIG. 10).

A coil 720 (for locking) is glued onto a lock ring 719 (see FIGS. 9, 10 and 14). The lock ring 719 has a lug 719a, the rear surface of which is provided with a bearing 719b (see FIG. 15). An armature pin 721 (see FIGS. 9 and 15) is inserted into an armature rubber bushing 722 and then inserted through the bearing 719b, an armature spring 723, and finally into an armature 724. The armature pin 721 is caulked to the armature 724.

The armature 724 is slidably moved relative to the lock ring 719 in the direction of an arrow 725 against the urging of the armature spring 723.

FIG. 15 is a view of the image stabilizing system viewed from behind in FIG. 9. As shown, the lock ring 719 is connected to the base plate 71 in a bayonet-mounting method, in which the lock ring 719 is pushed into the base plate 71 with the outer-circumferential notches 719c (at three points) of the lock ring 719 aligned with the inner-circumference projections 71g (at three points) and is then turned clockwise to lock into place.

The lock ring 719 is rotatable around the optical axis relative to the base plate 71. A rubber lock 726 is pressed into the base plate 71 (see FIGS. 9 and 15) in order to prevent the bayonet mount from being unlocked with the notches 719c of the lock ring 719 meeting the projections 71j. The lock ring 719 is thus permitted to rotate by an angle of θ until a notch 719d is restrained by the rubber lock 726 (see FIG. 15).

The permanent magnet 718 (for locking) is attached to a locking yoke 727 made of a magnetic material (FIG. 9). The locking yoke 727 is attached to the base plate 71 with holes 727a (at two points) of the locking yoke 727 receiving pins 71k of the base plate 71 and with holes 727b (at two points) aligned with 71n (at two points) with screws.

The permanent magnet 718 on the base plate 71, the permanent magnet 718 on the locking yoke 727, the second yoke 72 and locking yoke 727 form a known closed magnetic path.

The rubber lock 726 is prevented from coming off because the locking yoke 727 is affixed by screws. For convenience of explanation, the locking yoke 727 is not shown in FIG. 15.

A lock spring 728 is extended between a hook 719e of the lock ring 719 and a hook 71m of the base plate 71 (FIG. 15) in order to urge clockwise the lock ring 719. An attracting coil 730 is loaded on an attracting yoke 729 (FIGS. 9 and 15). The attracting yoke 729 is secured to the base plate 71 at a hole 729a with a screw.

The terminals of the coil 720 and the attracting coil 730 may be four wires in twisted pair with Tetoron covering and are soldered to the cores 716d of the flexible circuit board 716.

ICs 731p, 731y (FIG. 9) on the hard circuit board 715 are amplifier ICs for amplifying the outputs of position sensor output terminals 78p, 78y. Their circuits are shown in FIG. 16 (the circuit of IC 731p only is shown here because both ICs 731p, 731y are identical).

Referring to FIG. 16, current-voltage converter amplifiers 731ap, 731bp convert, into voltages, currents 78i1p, 78i2p in position sensor 78p (including resistors R1, R2) generated by the light emission device 77p, and a differential amplifier 731cp determines and amplifies a differential between the outputs of the current-voltage converter amplifiers 731ap, 731bp.

The light rays from the light emission devices 77p, 77y are directed to the position sensor devices 78p, 78y via slits 75ap, 75ay, respectively. When the support frame 75 moves in a plane perpendicular to the optical axis, the incident positions of the light rays to the position sensor devices 78p, 78y change.

The position sensor device 78p has a gain directivity in the direction of an arrow 78ap (FIG. 9), while the slit 75ap is shaped to diverge the light ray in the direction perpendicular to the arrow 78ap (namely in the direction of 78ay) and to converge the light ray in the direction of the arrow 78ap. Only when the support frame 75 moves in the direction of an arrow 713p, the balance between the currents $78i_1p$, $78i_2p$ in the position sensor device 78p changes causing the differential amplifier 731cp to give an output according to the movement of the support frame 75 in the direction of the arrow 713p.

The position sensor device 78y had a gain directivity in the direction of an arrow 78ay (FIG. 9), while the slit 75ay is shaped to diverge the light ray in the direction perpendicular to the arrow 78ay (namely in the direction of 78ap). The output of the position sensor device 78y changes its output only when the support frame 75 moves in the direction of an arrow 713y.

A summing amplifier 731dp sums the outputs of the current-voltage converter amplifiers 731ap, 731bp (sum of the amounts of light received by the position sensor device 78p), and a driving amplifier 731ep drives the light emission device 77p in response to the sum signal.

The light emission device 77p changes its output light level in an extremely unstable manner due to temperature change and the like, and along with such changes, the absolute amount $(78i_1p+78i_2p)$ of the currents $78i_1p$, $78i_2p$ of the position sensor device 78p varies.

For this reason, the output of the differential amplifier 731cp indicating the position of the support frame 75 $(78i_1p-78i_2p)$ also varies.

When the driving circuit controls the light emission device 77p so that the sum of the amount of light received is constant, no variations take place in the output of the differential amplifier 731cp.

The coils 76p, 76y shown in FIG. 9 are located in the closed magnetic path formed of the first yoke 712 and second yoke 72. By causing a current to flow through the coil 76p, the support frame 75 is driven in the direction of the arrow 713p (under Flemming's rule), and by causing a current to flow through the coil 76y, the support frame 75 is driven in the direction of the arrow 713y.

The outputs of the position sensor devices 78p, 78y are amplified by ICs 731p, 731y, and the outputs of ICs 731p, 731y are used to drive the coils 76p, 76y. The support frame 75 is thus driven, changing the outputs of the position sensor devices 78p, 78y.

If the direction of driving (polarity) of the coils 76p, 76y is set such that the outputs of the position sensor devices 78p, 78y gets smaller (negative feedback), the support frame 75 is stabilized when the outputs of the position sensor devices 78p, 78y driven by the coils 76p, 76y are almost zero.

A driving method in which a position sensor output is supplied in a negative feedback loop is called position control method. When a target value (for example, a shake angle signal) is input to ICs 731p, 731y from outside, the support frame 75 is faithfully driven toward the target value.

In an actual circuit arrangement, the outputs of the differential amplifiers 731cp, 731cy are sent to an unshown main circuit board via the flexible circuit board 716, and the outputs are analog-to-digital (A/D) converted there and then fed to a microcomputer.

In the microcomputer, the A/D converted signal is compared to a target value (shake angle signal), amplified and is subjected to phase lead compensation (for stabilizing position control) using a known digital filtering technique, transmitted through the flexible circuit board 716 to IC 732 (for driving the coils 76p, 76y). Based on the input signal, IC 732 drives the coils 76p, 76y in a known PWM method (Pulse Width Modulation), thereby driving the support frame 75.

The support frame 75 is slidably movable in the directions shown by the arrows 713p, 713y as already described, and stabilizes the camera through position control method. In consumer optical apparatuses such as cameras, however, the support frame 75 cannot be continuously controlled from the standpoint of power saving. With the camera left in no-control state, however, the support frame 75 is free to move in a plane perpendicular to the optical axis, and some preventive step has to be devised against an impact sound or even damage which may be generated when the support frame 75 (its mechanical end, more specifically the end of the lock ring) reaches its stroke limit.

A lock mechanism for locking the support frame 75 as such a preventive step is incorporated as described below.

Referring to FIGS. 15 and 17(A and B) the support frame 75 has, on its rear side, three radially extended projections 75f, and the ends of the projections 75f are engaged with the inner circumference 719g of the lock ring 719. The support frame 75 is thus restrained by the base plate 71 in all directions.

FIGS. 17A and 17B are rear views showing the working relationship of the lock ring 719 and support frame 75, and show major portions extracted from FIG. 15. For convenience of explanation, FIGS. 17A and 17B are drawn slightly differently from their actually assembled state. Cam sections 719f (at three points) shown in FIG. 17A are not fully longitudinally extended along the inner circumference of the lock ring 719 as shown in FIGS. 10 and 14, though they are not seen in FIG. 15.

As shown in FIG. 10, the coil 720 is located in the magnetic path between the permanent magnets 718, and by causing a current to flow through the coil 720, a torque is generated to rotate the lock ring 719 around the optical axis (twisted lead wires 720a shown in FIGS. 17A and 17B are connected at terminals 719h to an unshown flexible circuit board that is routed around the outer circumference of the lock ring 719 and connected to terminals 716e of the cores 716d of the flexible circuit board 716).

To drive the coil 720, an unshown microcomputer issues a command to a driver IC 733 on the hard circuit board 715 via the flexible circuit board 716 for control. IC 733 drives the coil 720 in PWM method.

Referring to FIG. 17A, the coil 720 is wound such that the coil 720, when energized, generates a torque for causing the lock ring 719 to rotate counterclockwise. The lock ring 719 thus rotates counterclockwise against the urging of the lock spring 728.

Before being energized, the lock ring 719, urged by the lock spring 728, remains stably in contact with the rubber lock 726.

When the lock ring 719 rotates, the armature 724 is put into contact with the attracting yoke 729 compressing the armature spring 723, thereby equalizing the attracting yoke 729 and the armature 724 in position. The lock ring 719 stops rotating as shown in FIG. 17B.

FIG. 18 is a timing diagram for lock ring driving.

The attracting coil 730 is also energized (730a) at the moment the coil 720 is energized (PWM-driven as indicated 720b) at an arrow 719i as shown in FIG. 18. When the armature 724 is in contact with and equalized with the attracting yoke 729, the armature 724 is attracted by the attracting yoke 729.

When the supply of power to the coil 720 stops at time 720c as shown in FIG. 18, the lock ring 719 attempts to rotate clockwise under the urging of the lock spring 728. The rotation of the lock ring 719 is restrained because the armature 724 is attracted by the attracting yoke 729. Since the projections 75f of the support frame 75 face the respective cam sections 719f (the cam sections 719f draw near in rotation), the support frame 75 is free to move within the clearance permitted between the projections 75f and the cam sections 719f.

Although the support frame 75 is subject to gravity G (see FIG. 17B), the support frame 75 is prevented from falling because it is also controlled at time 719i in FIG. 18.

The support frame 75 is restrained by the inner circumference of the lock ring 719 during no-control state, but there remains a looseness corresponding to fit looseness between the projections 75f and the inner circumference 719g. The support frame 75 falls in the direction of gravity G by the looseness, and is thereby offset from the center of the base plate 71. For this reason, the support frame 75 is slowly shifted back to be in alignment with the center of the base plate 71 (center of the optical axis) from time 719i, for example, taking one second.

This quick shifting of the support frame 75 to the center causes image motion, which a photographer finds uncomfortable when it is seen through the correction lens 74. Furthermore, degradation resulting from the shifting of the support frame 75 is precluded even if an exposure is performed during the shifting. (For example, the support frame 75 is shifted by 5 μm for ⅛ second.)

More particularly, the outputs of the position sensor devices 78p, 78y are stored at time 719i shown in FIG. 18, control of the support frame 75 starts with the outputs set as a target value, and for a duration of one second, the support frame 75 is shifted toward the target value of the center of the optical axis that is set beforehand (refer to 75g in FIG. 18).

After the lock ring 719 is rotated (in unlock state), the support frame 75 is driven based on a target value from vibration sensor means (along with the movement of the support frame 75 back to the center), and stabilization operation thus starts.

To end the stabilization, image stabilization is set to be off at time 719j, the target value from the vibration sensor is not fed to correction driving means for driving correction means, and the support frame 75 is controlled so as to move to its centered position. The supply of power to the attracting coil 730 stops (730b). Since the attracting force of the yoke 729 for attracting the armature 724 is now absent, the lock ring 719 is rotated clockwise back to the state shown in FIG. 17A by the lock spring 728. The lock ring 719 touches and is restrained by the rubber lock 726, and the sound generated by the lock ring 719 is thus controlled at a low level.

A few moments later (20 ms later, for example), control of the correction driving means shown in the timing diagram in FIG. 18 ends.

FIG. 19 is a block diagram showing a circuit related to the image-blur correction or image stabilization function only of the camera equipped with the image stabilizing system.

The output of shake sensor means 2 is amplified by amplifier means 3, and then input to an A/D converting terminal of a microcomputer 1. The output of position sensor means 4 for sensing the position of the correction lens is amplified by amplifier means 5, and input to an A/D converting terminal of the microcomputer 1. The microcomputer 1 processes these input data and, outputs correction lens drive data to correction data driving means 6 to drive the correction lens for image stabilization. Lock/unlock driving means 7 drives an unlock coil and maintains an unlock state.

Generally speaking, the longer the focal length, the quantity of image blurring on the film plane arising from camera shake gets larger.

Suppose that an optional lens is available in a single-lens-reflex camera having a built-in image stabilizing system and that the optional lens allows an extender as a converter for lengthening the focal length. A more accurate image stabilization is required if a higher magnification extender is used. Image stabilization along with a high-magnification extender makes a "sea-sickness" effect more pronounced, and image stabilization conditions are accordingly adjusted.

Since the full-aperture F-number gets larger with a higher magnification extender, the shutter time gets slow. A satisfactory image stabilization effect may not be achieved.

When a high-magnification extender is mounted, a tripod is frequently used. In such a case, the switching off of image stabilization makes image blurring on the film plane less. If the image stabilization is switched off, however, the image stabilization function cannot be used at all even if the mounted extender is the one having a moderate magnification at which the image stabilization still sufficiently works.

SUMMARY OF THE INVENTION

According to one aspect of the present invention, a device for use in a camera system which comprises a camera, an optical characteristics modifying converter, and an optical unit having an image stabilizing unit for stabilizing an image in response to the output of a vibration sensor for detecting a shake in an apparatus, includes an activating means for activating the stabilization operation by the image stabilizing unit in response to a predetermined operation in a predetermined operation portion section on the camera, a determining means for determining whether an optical characteristics modifying converter without image stabilization function is incorporated in the camera system, and a decision means for deciding whether to perform the activating operation by said activating means based on the determination by said determining means, wherein the operation of the image stabilizing unit is determined by the incorporation of the converter.

According to another aspect of the present invention, a device for use in a camera system which comprises a camera, an optical characteristic modifying converter, and an optical unit having an image stabilizing unit for stabilizing an image in response to the output of a vibration sensor for detecting a shake in an apparatus, includes a determining means for determining whether the optical characteristics modifying converter is incorporated in the camera system, and a variable means for modifying frequency characteristics of the image stabilization operation in response to the determination by the determining means, wherein the operation of the image stabilizing unit is determined by the incorporation of the converter.

BRIEF DESCRIPTION OF THE DRAWINGS

FIG. 19 is a block diagram of a typical camera image stabilization system having an image stabilizing unit.

DESCRIPTION OF THE PREFERRED EMBODIMENTS

Figure 1:
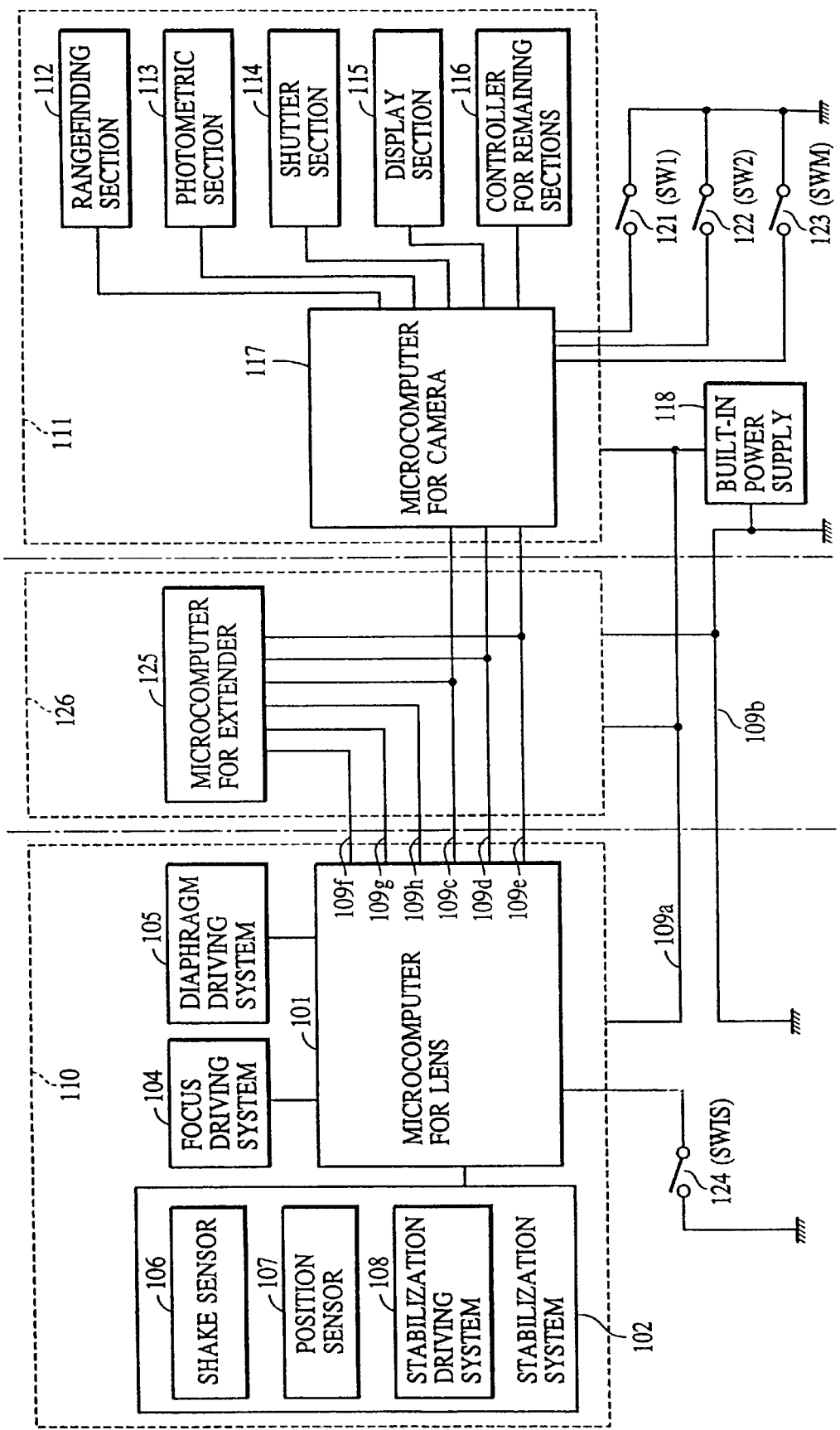
FIG. 1 is a block diagram showing a single-lens-reflex camera and its optional lens assembly according to a first embodiment of the present invention.

Referring now to the drawings, the preferred embodiments of the present invention are discussed.

First Embodiment

FIG. 1 is a block diagram showing one embodiment of the present invention. Now in the context of the embodiments, an optional lens assembly in a single-lens-reflex camera is assumed as an optical apparatus with an image stabilization function.

Referring to FIG. 1, a lens driving microcomputer 101 receives instructions from a camera main unit through a line 109c (for a clock signal) and line 109d (for lens signal transmission from the camera main unit), and in response to the values of the instructions, operates a stabilization system 102, a focus driving system 104, a diaphragm driving system 105, and controls the stabilization system 102.

The stabilization system 102 comprises a shake sensor 106 such as an angular displacement sensor for sensing a shake, a position sensor 107 for sensing the position of a correction lens, and a stabilization driving system 108 which drives the correction lens for image stabilization or image-blur correction based on a drive signal the lens driving microcomputer 101 computes from the outputs of the shake sensor 106 and position sensor 107.

An image stabilization start switch 124 (also designated as SWIS) starts an image stabilization operation. To select the image stabilization operation, this switch SWIS is turned on.

The focus driving system 104 performs focusing by driving a focusing lens in accordance with an instruction from the lens driving microcomputer 101. The diaphragm driving system 105 closes the diaphragm to a set position or returns the diaphragm to its open setting in accordance to instructions from the lens driving microcomputer 101.

The lens driving microcomputer 101 transmits, to the camera main unit, lens setting data (zoom position, focus position, diaphragm setting) and data about the lens (full-aperture diaphragm stop, focal length, data for rangefinding) via a communication line 109e (for transmission from the lens side to the camera main unit). In case of an extender-based lens, communication lines 109f, 109g and 109h for an extender are employed. The lens driving microcomputer 101 monitors the signals from the lines and determines the type of extender.

A lens electronic system 110 is constituted by the lens driving microcomputer 101, stabilization system 102, focus driving system 104, and diaphragm driving system 105. A built-in camera power supply 118 supplies power to the lens electronic system 110 via a communication line 109a and a ground line 109b.

The extender contains an extender microcomputer 125. Besides the communication lines 109f, 109g and 109h to communicate with the lens side, the extender has also communication lines respectively connected to communication lines 109c, 109d, and 109e. The built-in camera power supply 118 supplies power to an extender electronic system 126.

The camera main unit includes, in its electronic system 111, a rangefinding section 112, a photometric section 113, a shutter section 114, a display section 115, a controller 116, and a camera microcomputer 117 for controlling these sections, for example to start and stop the camera, and for performing exposure and rangefinding computation. The built-in power supply 118 also supplies power to the camera main unit electronic system 111.

A switch 121 (also designated SW1) starts a photometric operation and a rangefinding operation. A switch 122 (also designated SW2) is a release switch. These switches are jointly constituted by a two-stroke switch. The switch SW1 is turned on at a first stroke of the two-stroke switch, and the release switch SW2 is turned on at a second stroke of the two-stroke switch.

A switch 123 (also designated SWM) is an exposure mode selection switch. The exposure mode of the camera is changed by switching on and off the switch 123. The switch 123 is also used in combination with other operation members.

The operation of the optional lens of the camera is now discussed.

Figure 2:
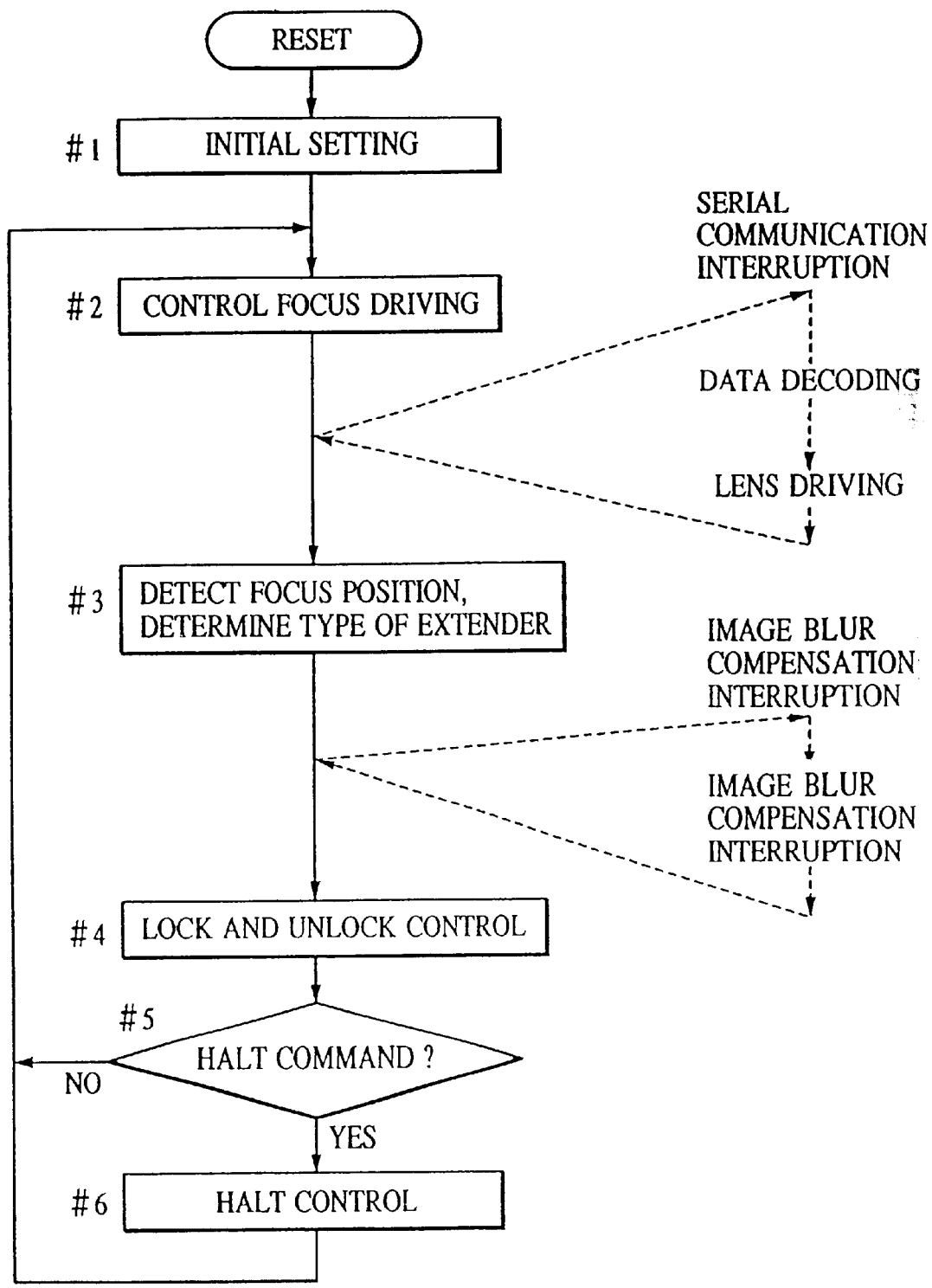
FIG. 2 is a flow diagram of the main operation of a microcomputer for lens driving of FIG. 1.

The lens driving microcomputer 101 follows a flow diagram shown in FIG. 2 to control the lens. The operation is now discussed referring to FIG. 2.

When any operation step is taken by the camera, for example, the switch SW1 is turned on, a signal is communicated between the camera main unit (hereinafter simply referred to as the camera) and the optional lens (hereinafter simply referred to as the lens). The lens driving microcomputer 101 starts operation with step #1.

Step #1 Initial setting is made for lens control and image stabilization control.

Step #2 Focus driving is performed in response to a command from the camera.

Step #3 Zoom and focus positions are detected, and the type of a mounted extender is determined.

Figure 17A:
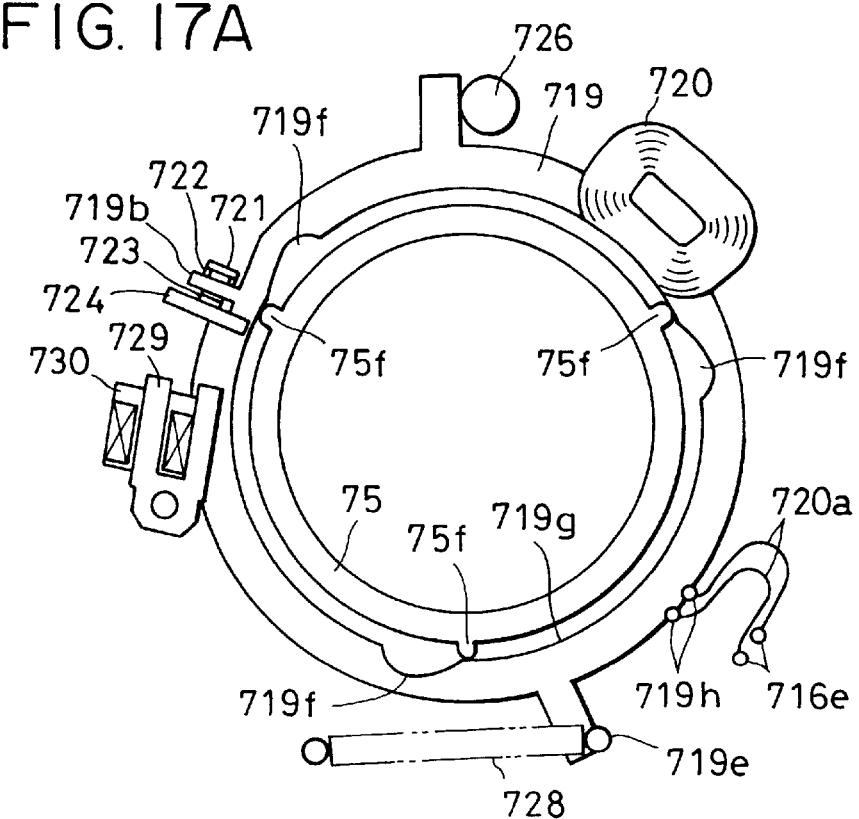
FIGS. 17A and 17B show the lock ring, in operation, of FIG. 8.
Figure 17B:
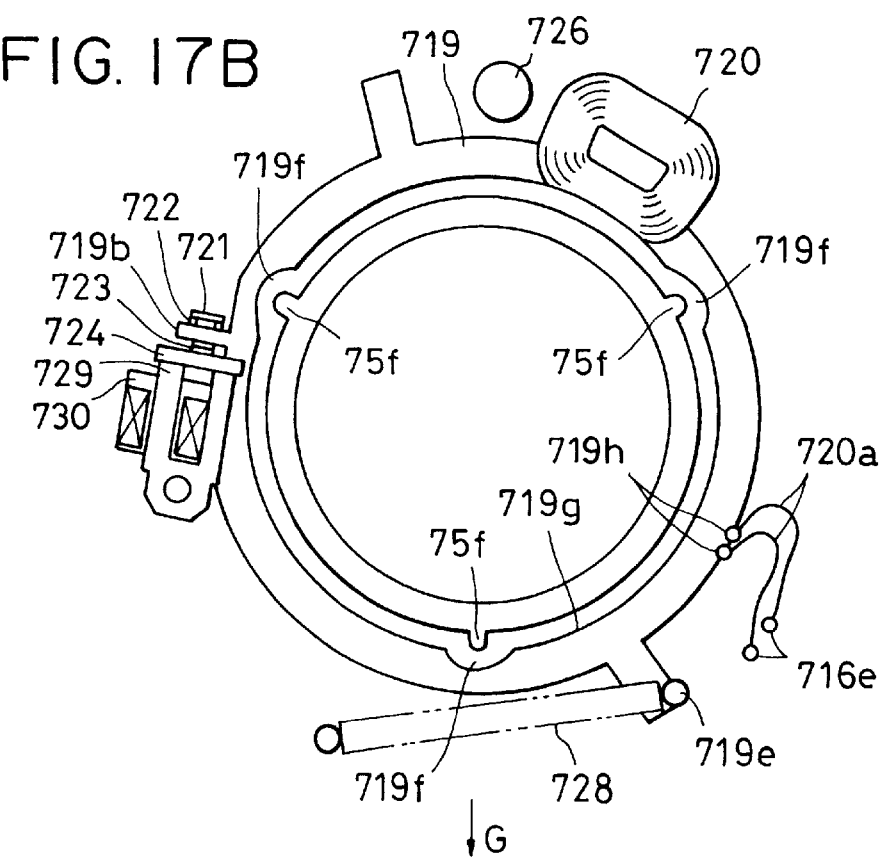
Figure 18:
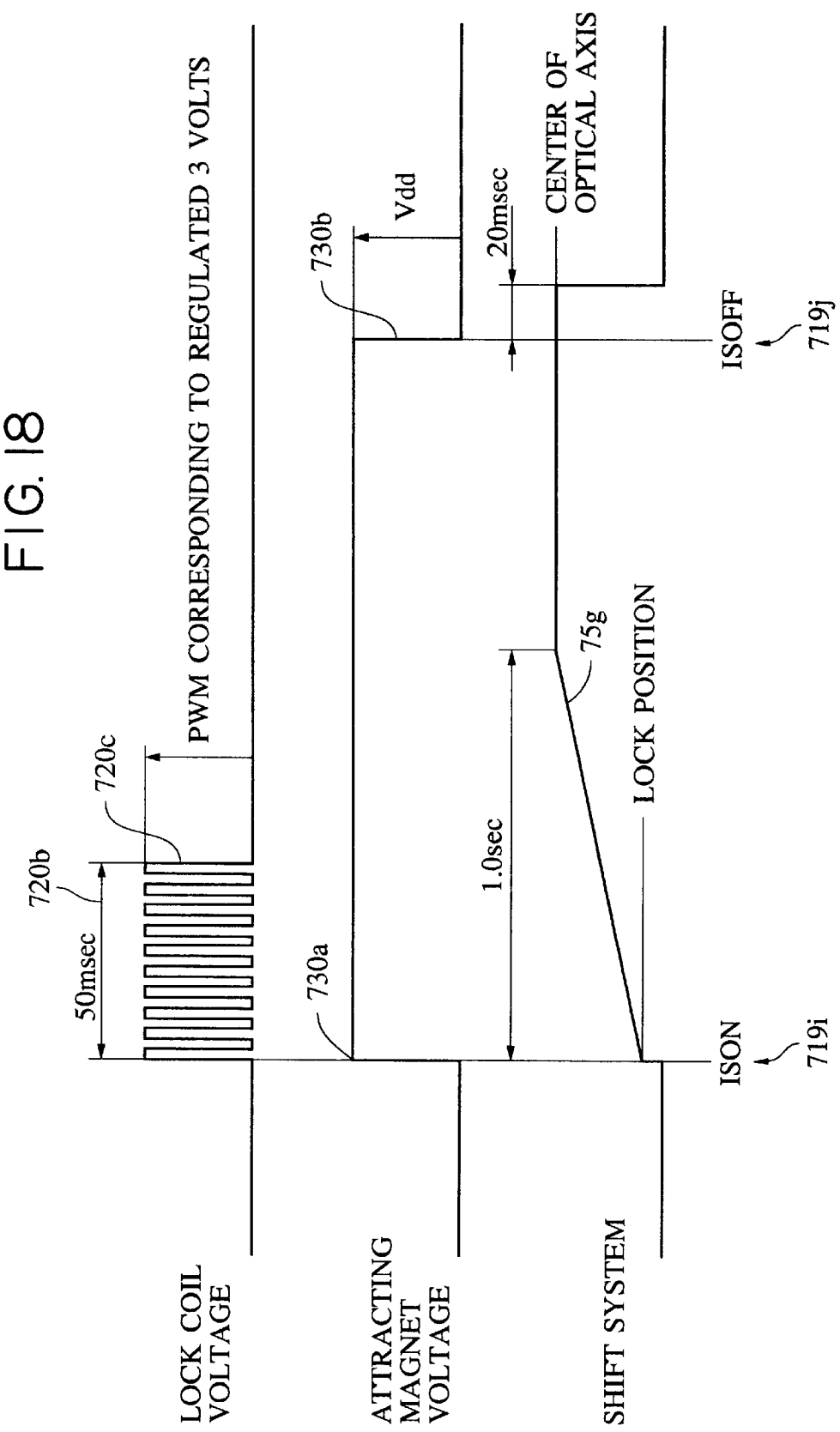
FIG. 18 shows waveform diagrams of signals during the operation of the lock ring of FIG. 16.

Step #4 The lock/unlock control of the support frame (correction lens) already described referring to FIG. 17 is performed according to instructions from the camera or the status of the switch SWIS.

Step #5 A determination is made of whether a HALT command (for stopping entirely driving an actuator in the lens assembly) is received from the camera. When the HALT command is not yet received, the lens driving microcomputer 101 repeats step #2 and subsequent steps. When the HALT command is already received in step #5, the lens driving microcomputer 101 goes to step #6.

Step #6 HALT control is performed. All driving is stopped, and the lens driving microcomputer 101 goes to a sleep mode (suspended state).

When a serial communication interrupt request or image stabilization interrupt request is received from the camera between these steps, such request is honored.

The process of a serial communication interrupt includes the decoding of data communicated and lens driving such as diaphragm driving. By decoding the communicated data, the ON state of the switch SW1 and the ON state of the switch SW2, the shutter speed, and the type of the camera are identified.

Figure 3:
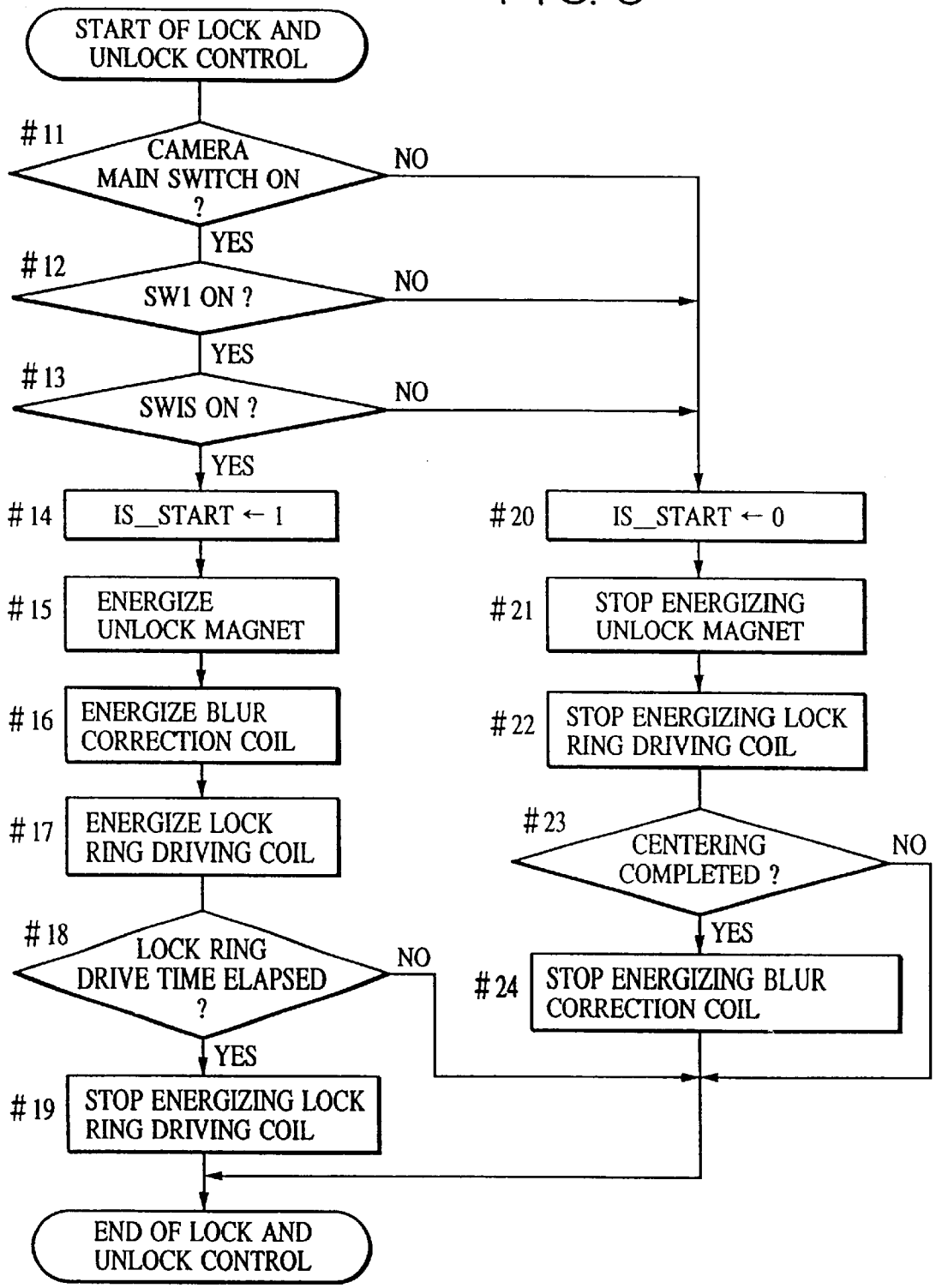
FIG. 3 is a flow diagram showing a lock/unlock operation executed by the lens-driving microcomputer shown in FIG. 1.
Figure 9:
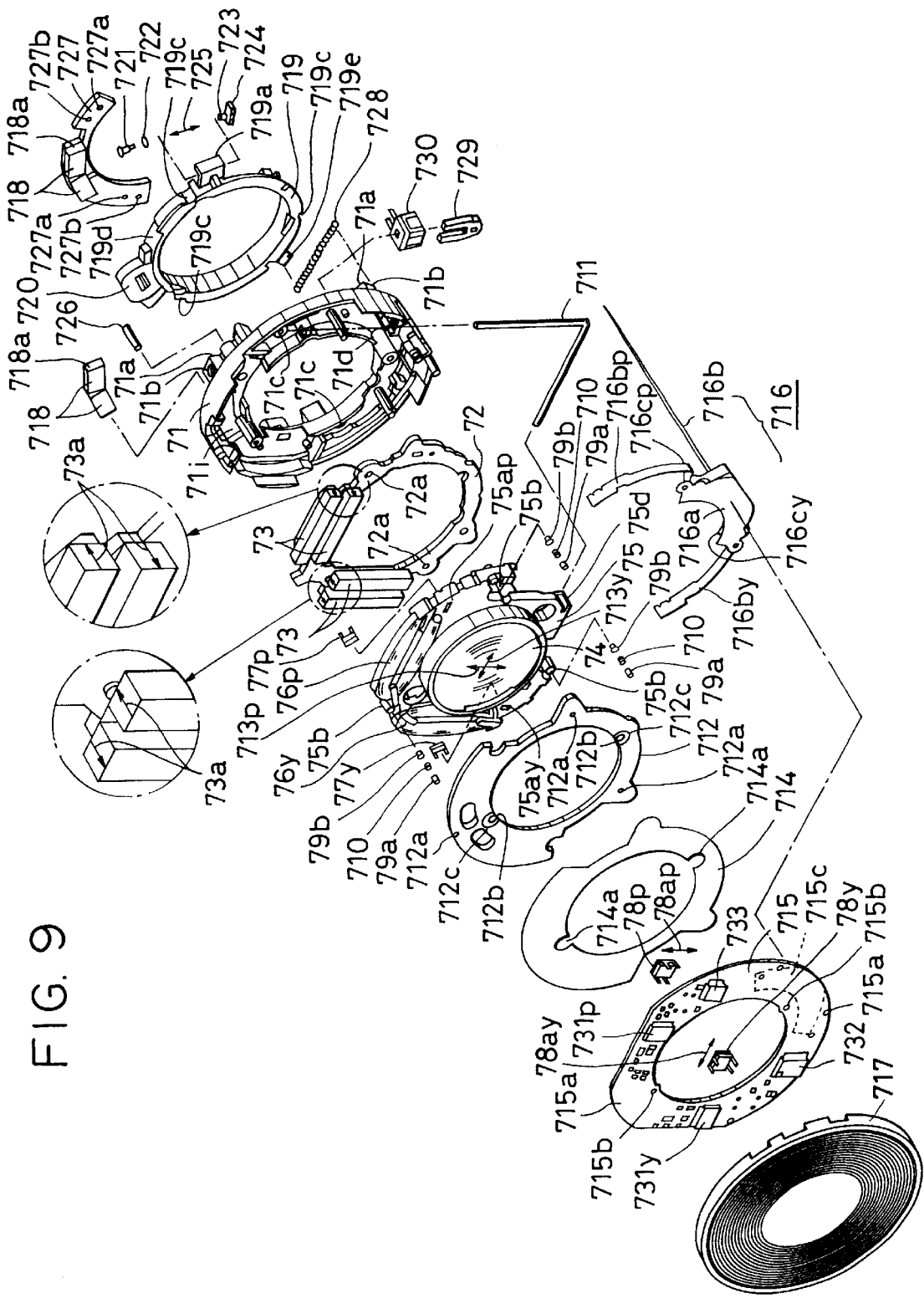
FIG. 9 is an exploded perspective view showing the construction of an image stabilizing unit of FIG. 8.
Figure 10:
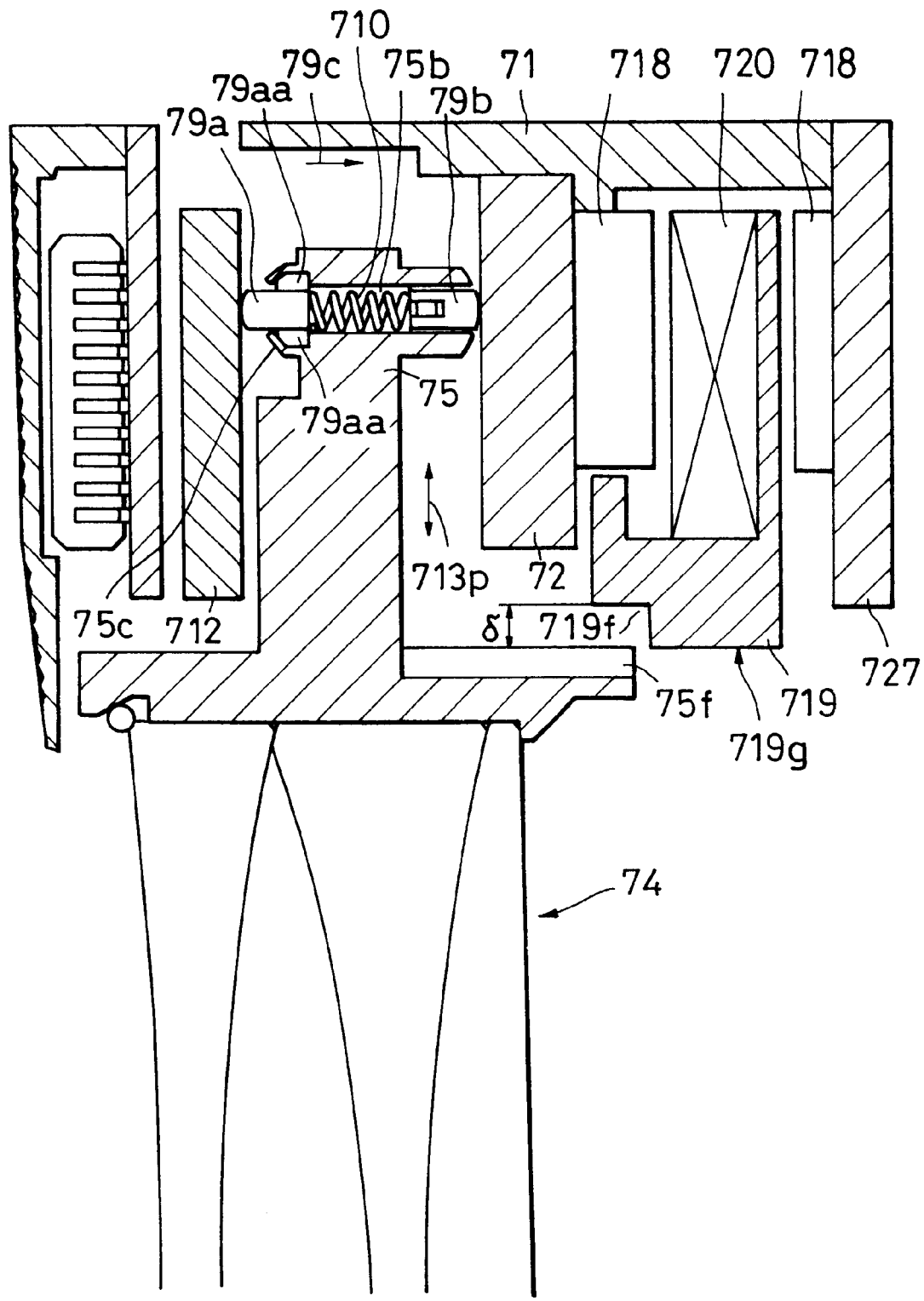
FIG. 10 shows the shape of a hole of a support frame of FIG. 8 through which clamp means is inserted.
Figure 11A:
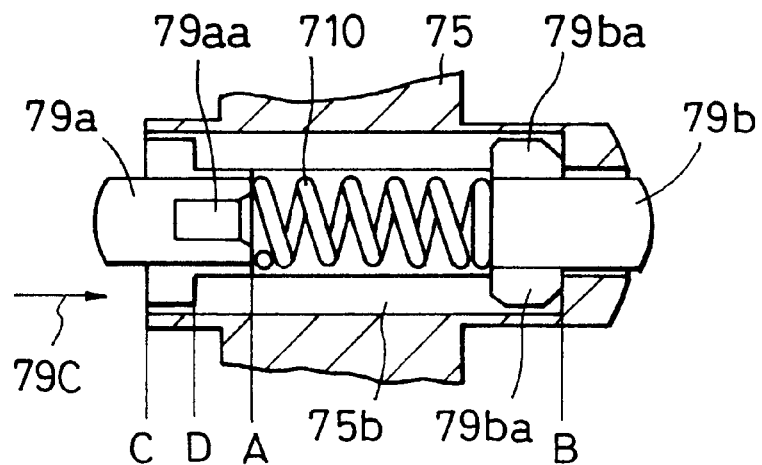
FIGS. 11A and 11B are cross-sectional views partly showing the support frame that is attached to a base plate of FIG. 8.
Figure 11B:
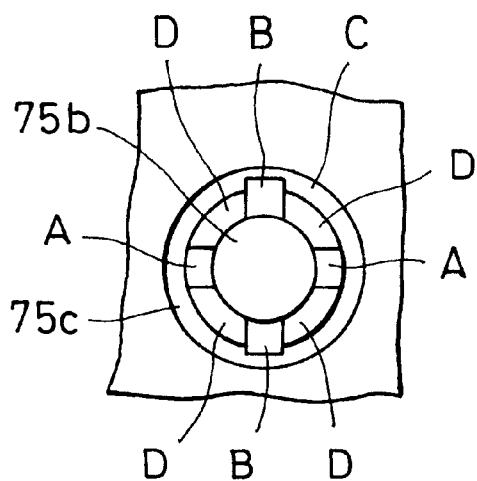
Figure 12:
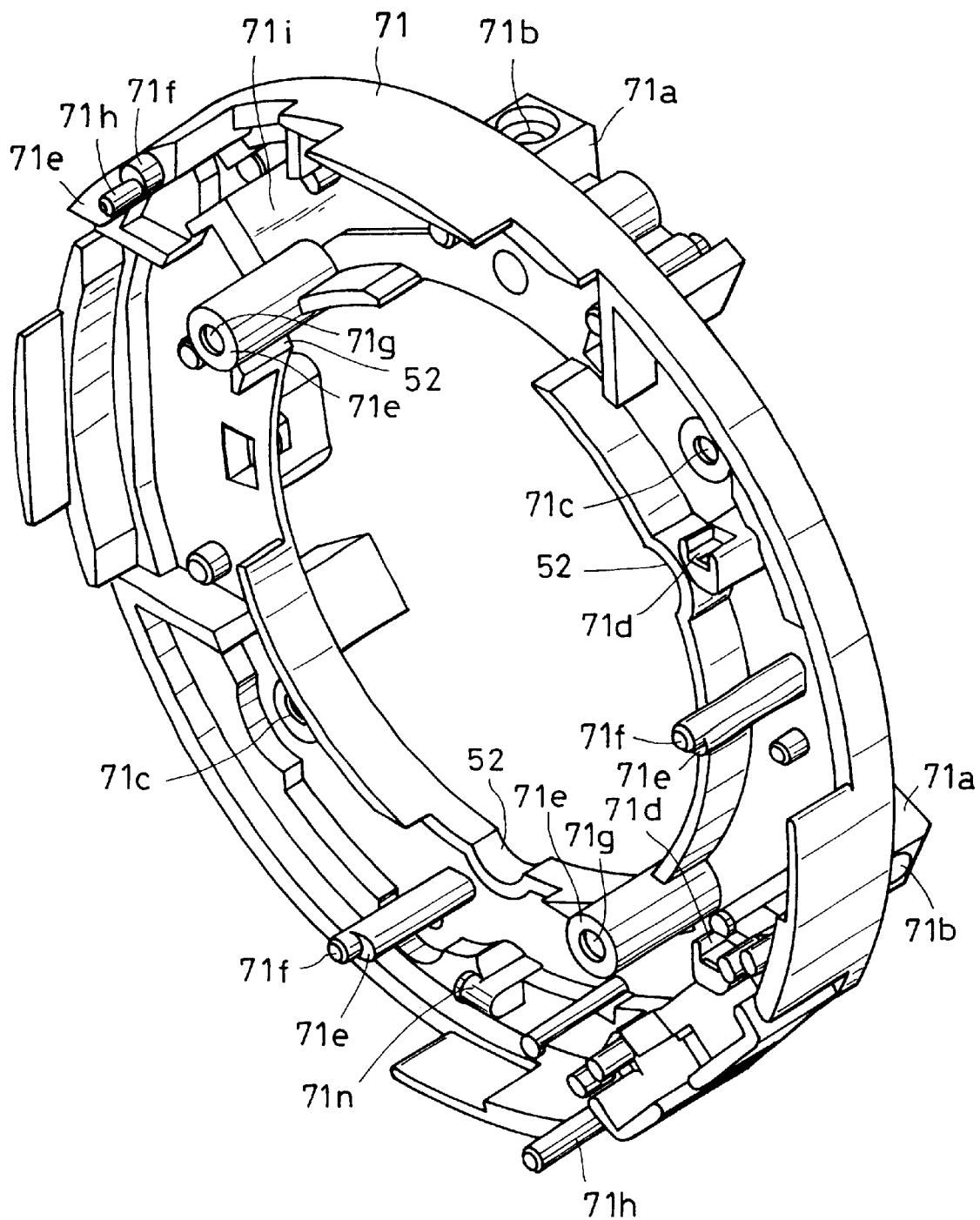
FIG. 12 is a perspective view showing the base plate of FIG. 8.
Figure 13:
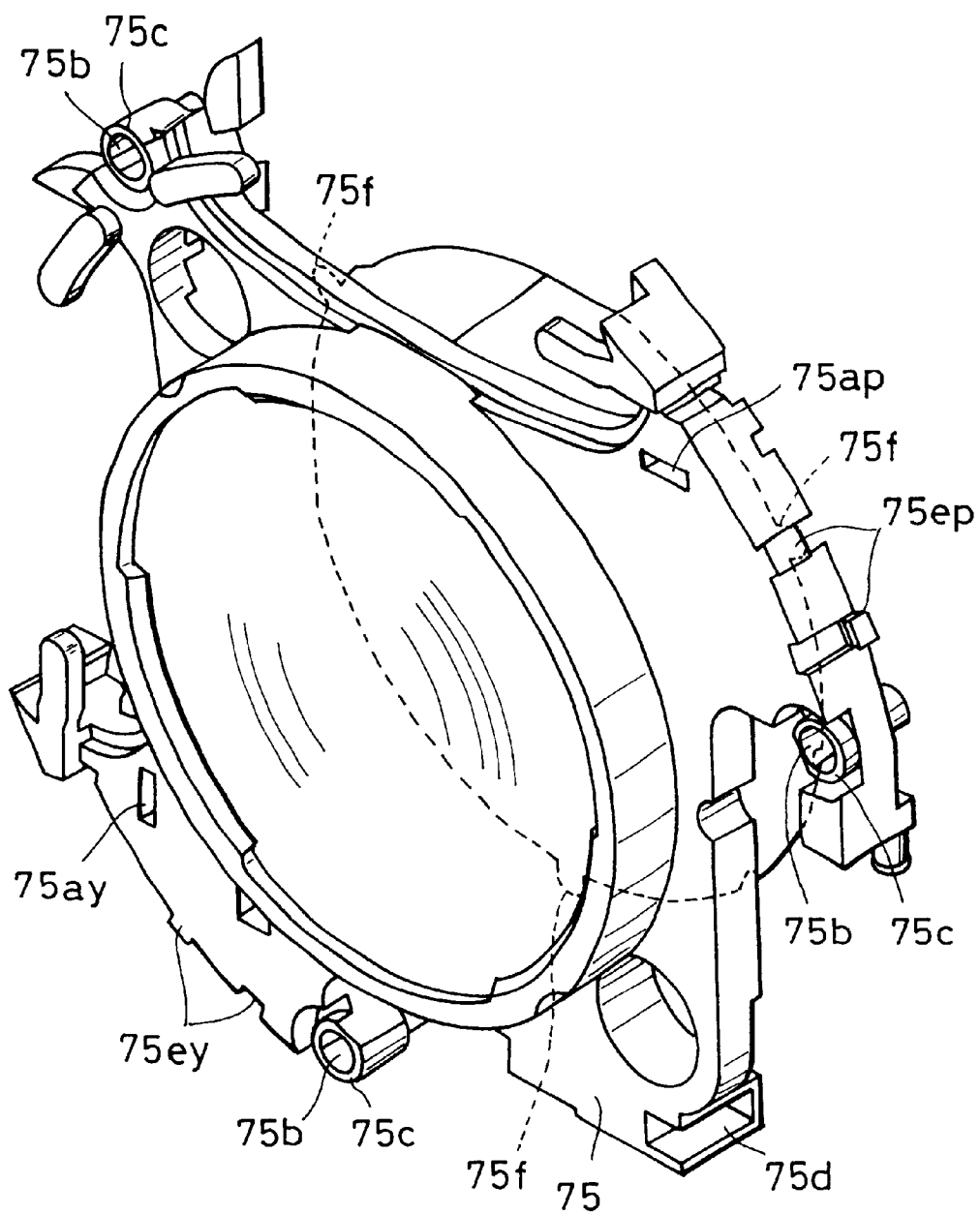
FIG. 13 is a perspective view showing the support frame of FIG. 8.
Figure 14:
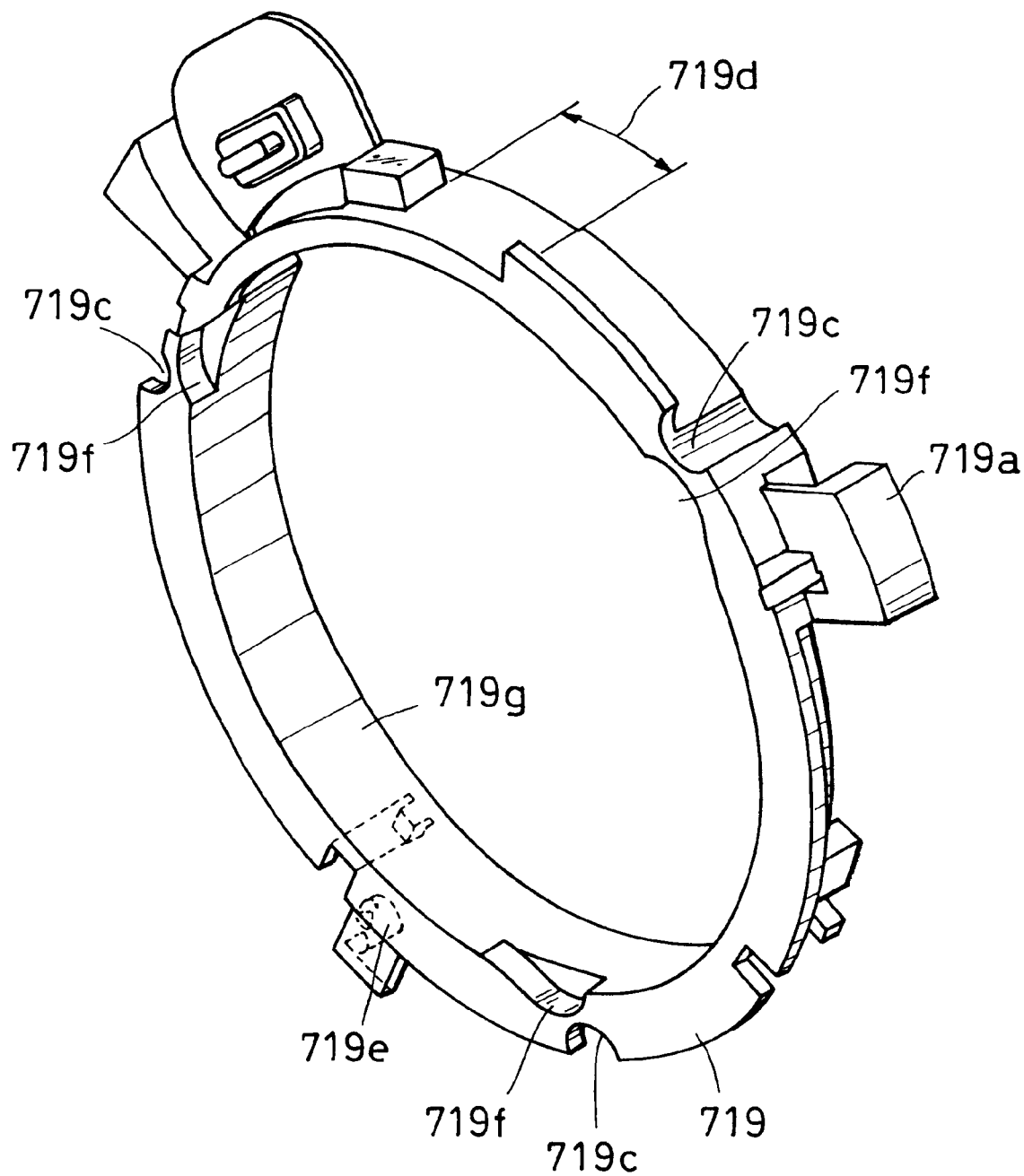
FIG. 14 is a perspective view showing a lock ring of FIG. 8.
Figure 15:
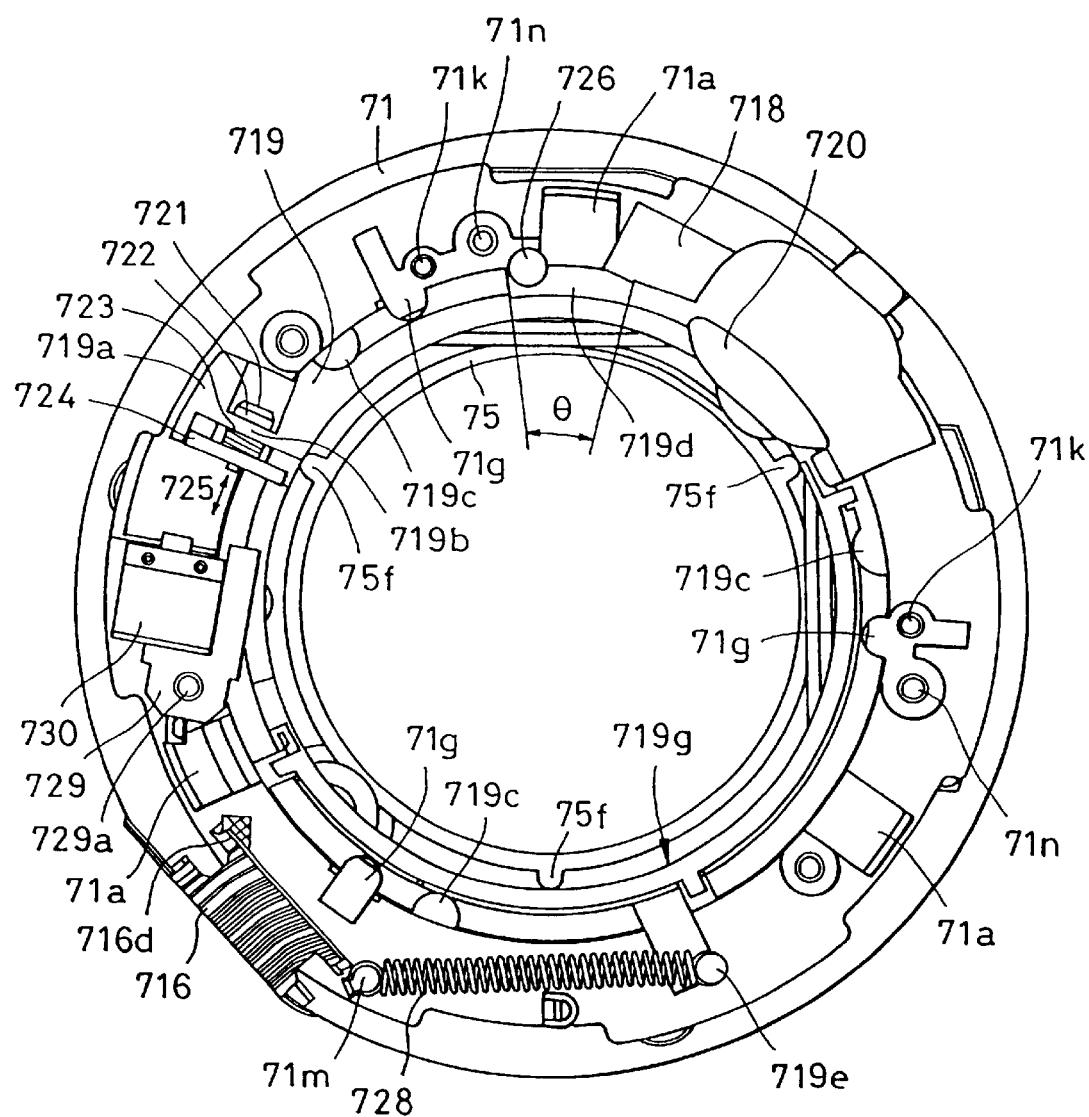
FIG. 15 is a front view showing the support frame and other associated components shown in FIG. 8.

Referring to a flow diagram shown in FIG. 3, the lock/unlock control operation executed in the above step #4 is now discussed. The image stabilizing unit in this embodiment is identical in construction to that described with reference to FIG. 9. In this system, the image stabilization operation starts at the moment the main switch, and switches SW1 and SWIS on the camera are all turned on.

Step #11 It is determined whether the camera main switch is turned on. When it is turned on, the process goes to step #12.

Step #12 It is determined whether the camera switch SW1 is turned on. When it is turned on, the process goes to step #13.

Step #13 It is determined whether the switch SWIS is turned on. When it is turned on, the process goes to step #14.

When the main switch, and switches SW1 and SWIS are all turned on, the image stabilization operation starts at step #14. When one of them remains off, an image stabilization end process in step #20 and subsequent steps is performed as will be described later.

Step #14 An image stabilization start flag IS_START is set.

Figure 16:
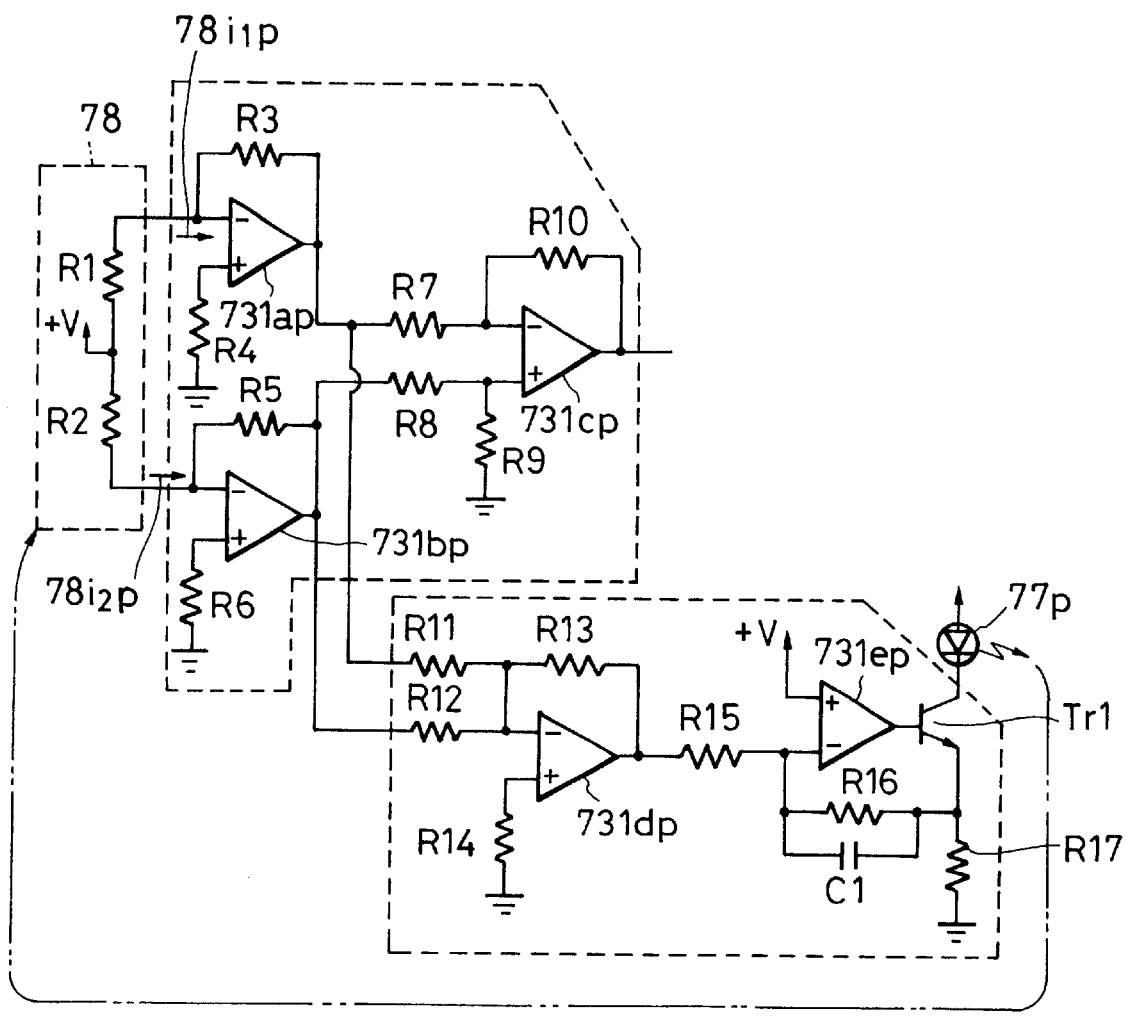
FIG. 16 is a schematic diagram of ICs for amplifying the output of the position sensor devices of FIG. 8.

Step #15 The unlock attracting magnet is energized. As already described in FIG. 16, this step is required to retain the lock ring rotated against the urging of the lock spring (unlock state).

Step #16 The stabilization drive coil is energized.

Step #17 The lock ring driving coil is energized to rotate the lock ring.

Step #18 It is determined whether a lock ring drive time has elapsed. The lock ring drive time is preset during which the unlock state is kept by the unlock attracting magnet even if the lock ring stops its rotation in the subsequent step #19. When the lock ring drive time has not elapsed yet, this subroutine ends, and the same operation is repeated until the lock ring drive time elapses. When the lock ring drive time elapses, the process goes to step #19.

Step #19 Energizing the lock ring driving coil is stopped. Now unlock state is entered.

As already described, if any of the main switch, and switches SW1 and SWIS remains off, the image stabilization end process in step #20 and subsequent steps is performed.

Step #20 The image stabilization flag IS START is cleared.

Step #21 Energizing of the unlock attracting magnet is stopped. The lock spring rotates the lock ring in a lock direction into a locked state.

Step #22 Since there is a possibility that any of the switches is turned off during the lock ring driving, energizing of the lock ring driving coil is stopped just in case.

Step #23 It is determined whether the centering operation for moving the correction lens to the center position of its movable range is completed. When the centering operation is not yet completed, this subroutine ends, and the same operation is repeated until the centering operation is completed. When the end of the centering operation is determined, the process goes to step #24.

Step #24 Since the correction lens is at the center position of the movable range, the energizing of the stabilization driving coil is stopped.

The lock/unlock operation is thus performed.

The image stabilization interrupt is a timer interrupt that is generated at regular intervals (every 500 ms, for example). Since control operation alternates between a pitch (vertical direction) control and a yaw (horizontal direction) control, a sampling interval in one direction is 1 second. Although the same control method (computation coefficients) applies to both pitch and yaw controls, the pitch and yaw controls result in different data. Base addresses are separately set for the pitch and yaw controls, data such as computation results are designated by indirect addresses in RAM, and the base addressed are switched between the pitch control and the yaw control.

Figure 4:
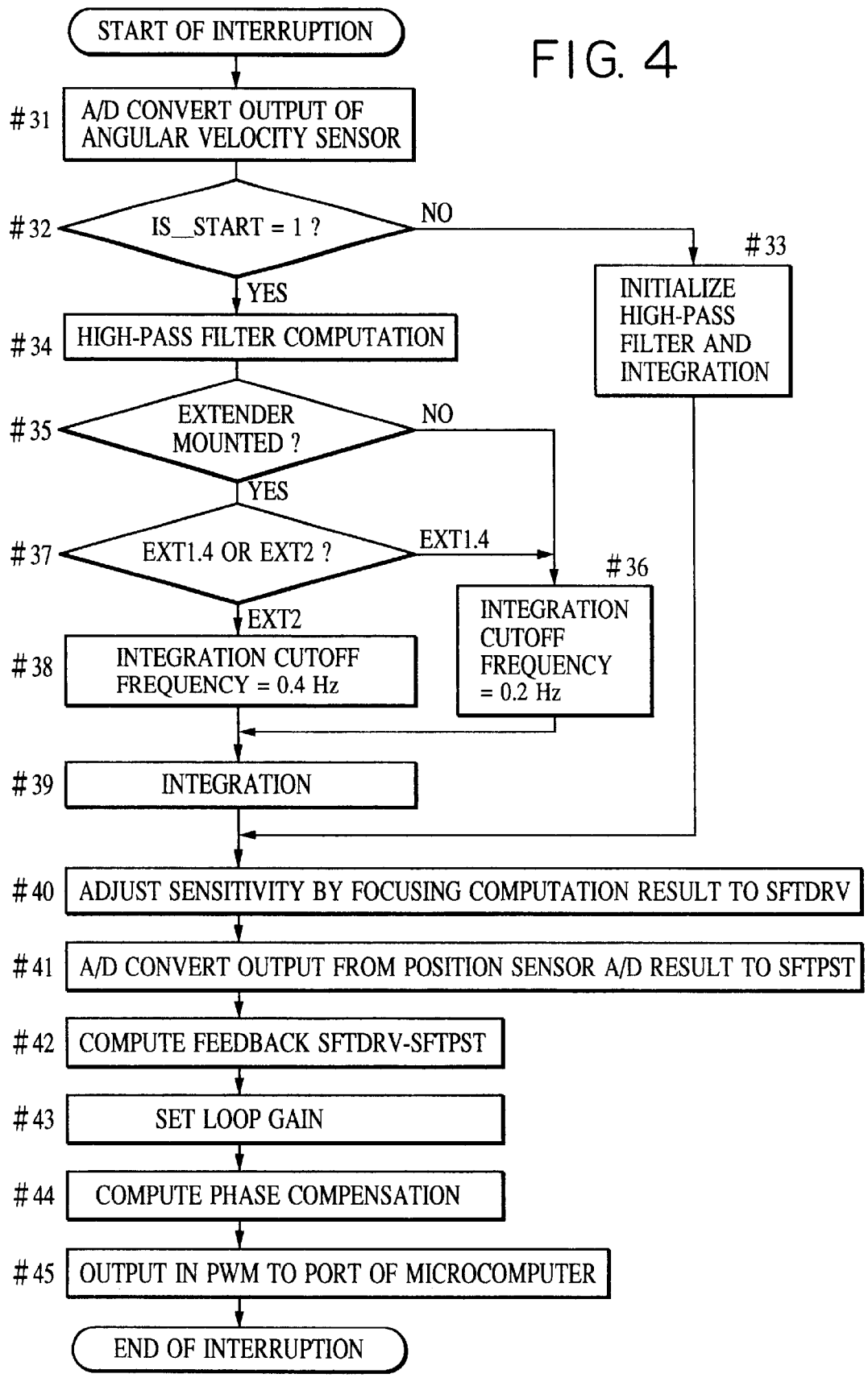
FIG. 4 is a flow diagram showing an image stabilization interrupt executed by the lens-driving microcomputer shown in FIG. 1.

When an image stabilization interrupt occurs in the middle of the main operation of the camera, the lens driving microcomputer 101 starts image stabilization control at step #31 as shown in FIG. 4.

Step #31 The output of shake sensor means, for example, an angular velocity sensor, is A/D-converted.

Step #32 It is determined whether an image stabilization start command is received. When no image stabilization start command is received, the lens driving microcomputer 101 goes to step #33.

Step #33 Since no image stabilization is performed, the lens driving microcomputer 101 initializes high-pass filtering and integration computation, and then goes to step #40.

When it is determined in step #32 that an image stabilization start command is received, the lens driving microcomputer 101 goes to step #34.

Step #34 A high-pass filtering computation is performed to start image stabilization. Within 2 to 3 seconds from the start of image stabilization, the time constant is changed to alleviate image fluctuation at a startup of operation.

Step #35 It is determined whether an extender is mounted. When no extender is mounted, the lens driving microcomputer 101 goes to step #36.

Step #36 Since no extender is mounted, the cutoff frequency of integration is set to 0.2 Hz. The lens driving microcomputer 101 goes to step #39.

When it is determined in step #35 that an extender is mounted, the lens driving microcomputer 101 goes to step #37.

Step #37 The type of the extender is determined. When a 1.4-time magnification extender is mounted, the lens driving microcomputer 101 goes to step #36 to set integration characteristics (0.2 Hz of cutoff frequency) equal to integration characteristics without extender, because of its relatively low magnification. When a 2-time magnification extender is mounted, the lens driving microcomputer 101 goes to step #38.

Step #38 Since the 2-time magnification extender is mounted, integration characteristics having a higher cutoff frequency (0.4 Hz) are set to restrict the seasickness effect.

Step #39 Integration computation of set characteristics is performed. The results are angular displacement data θ.

Step #40 Since the amount of decentration (sensitivity) of the correction lens to shake angle displacement varies depending on focus position, the amount of decentration is adjusted.

More specifically, the range of focus is partitioned into several zones, and the average sensitivity (degree/mm) in each zone is read from tabled data and is converted into correction lens drive data. The computation result is stored in RAM area set in SFTDRV in the microcomputer.

Step #41 The output of the position sensor for detecting the position of the correction lens is A/D-converted, and the resulting digital data is stored in the RAM area in SFTPST in the microcomputer.

Step #42 Feedback computation (SFTDRV-SFTPST) is performed.

Step #43 The result of the feedback computation is multiplied by loop gain.

Step #44 To achieve a stable control system, phase compensation computation is performed.

Step #45 The result from the phase compensation computation in PWM is output to a port of the microcomputer, and this ends the interrupt operation.

The output of the lens driving microcomputer 101 is input to the stabilization driving system 108 in the stabilization system 102 to drive the correction lens for image stabilization.

As described above, steps #35–#38 modify the integration characteristics depending on the presence or absence of the extender and the type of the extender. Even with a high-magnification extender (a 2-time magnification extender in this embodiment) mounted, the seasickness effect conventionally encountered is alleviated, and an optimum image stabilization control is thus performed.

In this embodiment, the integration characteristics are changed depending on the presence or absence of the extender and the type of the extender as described above. This change may be performed in the phase compensation computation executed in step #44.

Second Embodiment

In a second embodiment, the image stabilization is not performed when a 2-time magnification extender is mounted.

The circuit arrangement of the second embodiment is identical to that of the first embodiment.

Figure 5:
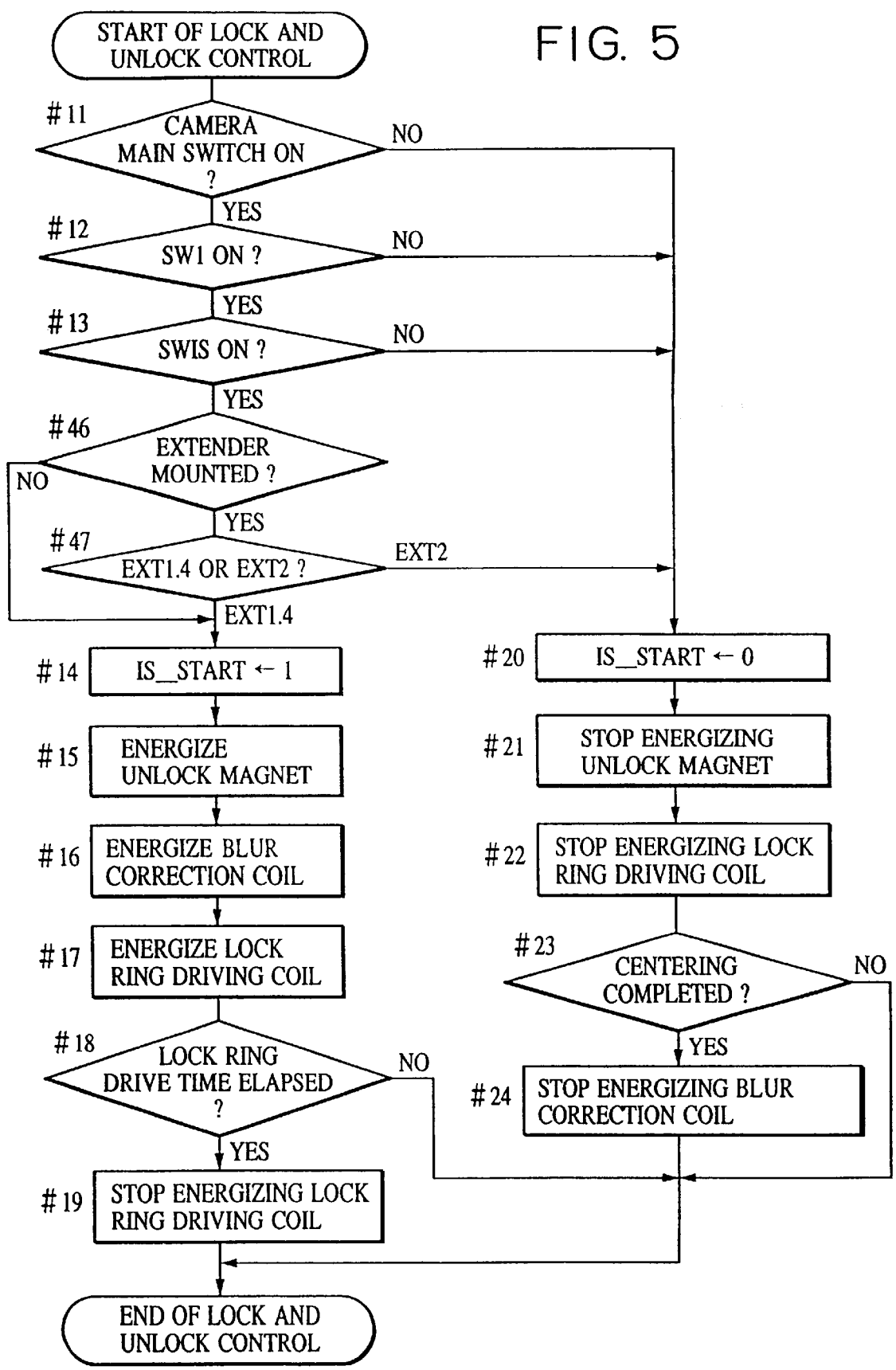
FIG. 5 is a flow diagram showing a lock/unlock operation executed by a microcomputer in an optional lens assembly according to a second embodiment of the present invention.
Figure 6:
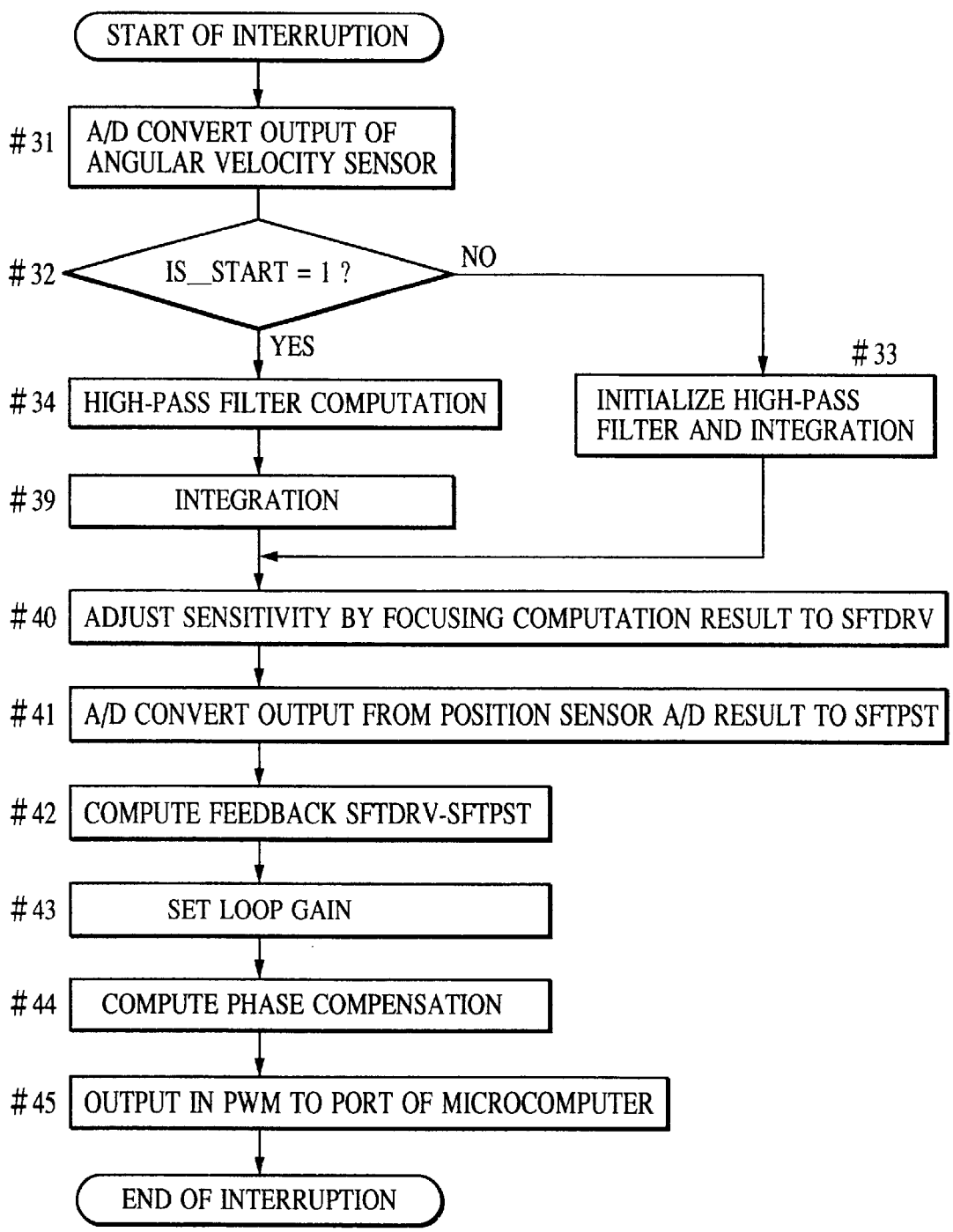
FIG. 6 is a flow diagram showing an image stabilization operation executed by the microcomputer in the optional lens assembly according to the second embodiment of the present invention.

Referring to flow diagrams shown in FIGS. 5 and 6, the operation of the second embodiment is now discussed. The following discussion focuses on the operation particular to the second embodiment and part of the operation common to the flow diagrams shown in FIGS. 3 and 4 is not discussed.

The flow diagram in FIG. 5 is discussed first. The difference from the diagram in FIG. 3 is that the image stabilization flag IS_START is not set when a 2-time magnification extender is mounted. This operation is carried out in steps #46–#47.

Step #46 A determination is made of whether an extender is mounted. When it is determined that no extender is mounted, the process goes to step #14 where the image stabilization start flag IS_START is set in the same way as the first embodiment. When it is determined that an extender is mounted, the process goes to step #47.

Step #47 The type of the extender is determined. When it is a 1.4-time magnification extender, the process goes to step #14, where the image stabilization start flag IS_START is set and the unlocking is performed. When it is a 2-time magnification extender, the process goes to step #20, where the image stabilization start flag is cleared and the unlocking is not performed.

The operation of image stabilization control is shown in the flow diagram in FIG. 6, which is identical to FIG. 4 but without steps #35–#38. The image stabilization control is altered depending on the status of the image stabilization start flag IS_START set in the lock/unlock control shown in FIG. 5.

In the subroutine of the lock/unlock control, as described above, the image stabilization start flag IS_START is cleared not to perform image stabilization when a 2-time magnification extender is mounted. When to 1.4-time magnification is mounted, the image stabilization start flag IS_START is set to perform image stabilization. In this way image stabilization is performed only when its performance is fully exhibited.

Third Embodiment

In a third embodiment, the image stabilization is performed even with a 2-time magnification extender mounted, depending on the type (model) of the camera to which the optional lens is mounted.

The circuit arrangement of the third embodiment remains identical to that of the first embodiment.

Figure 7:
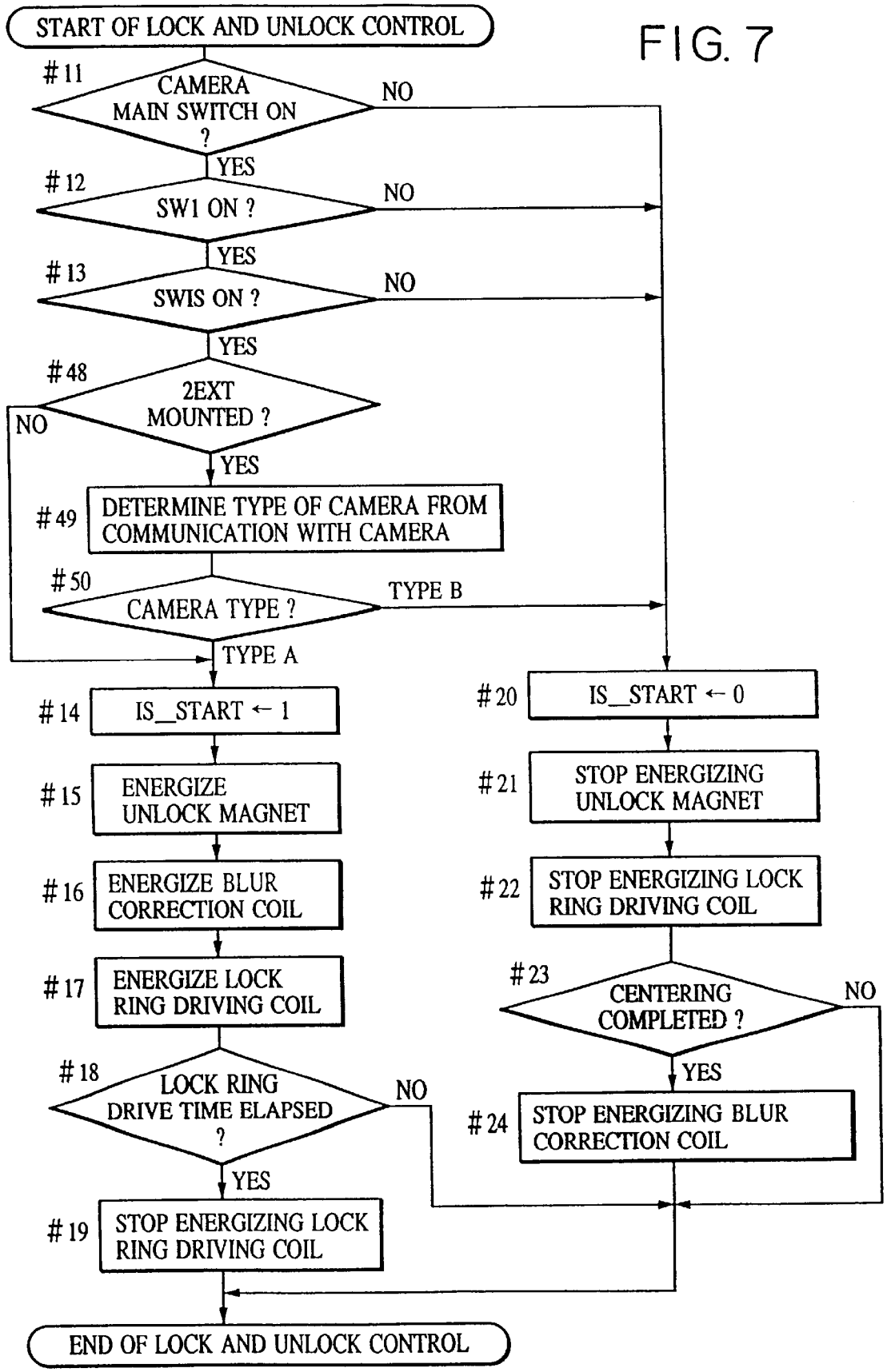
FIG. 7 is a flow diagram showing a lock/unlock operation executed by a microcomputer in an optional lens assembly according to a third embodiment of the present invention.
Figure 8:
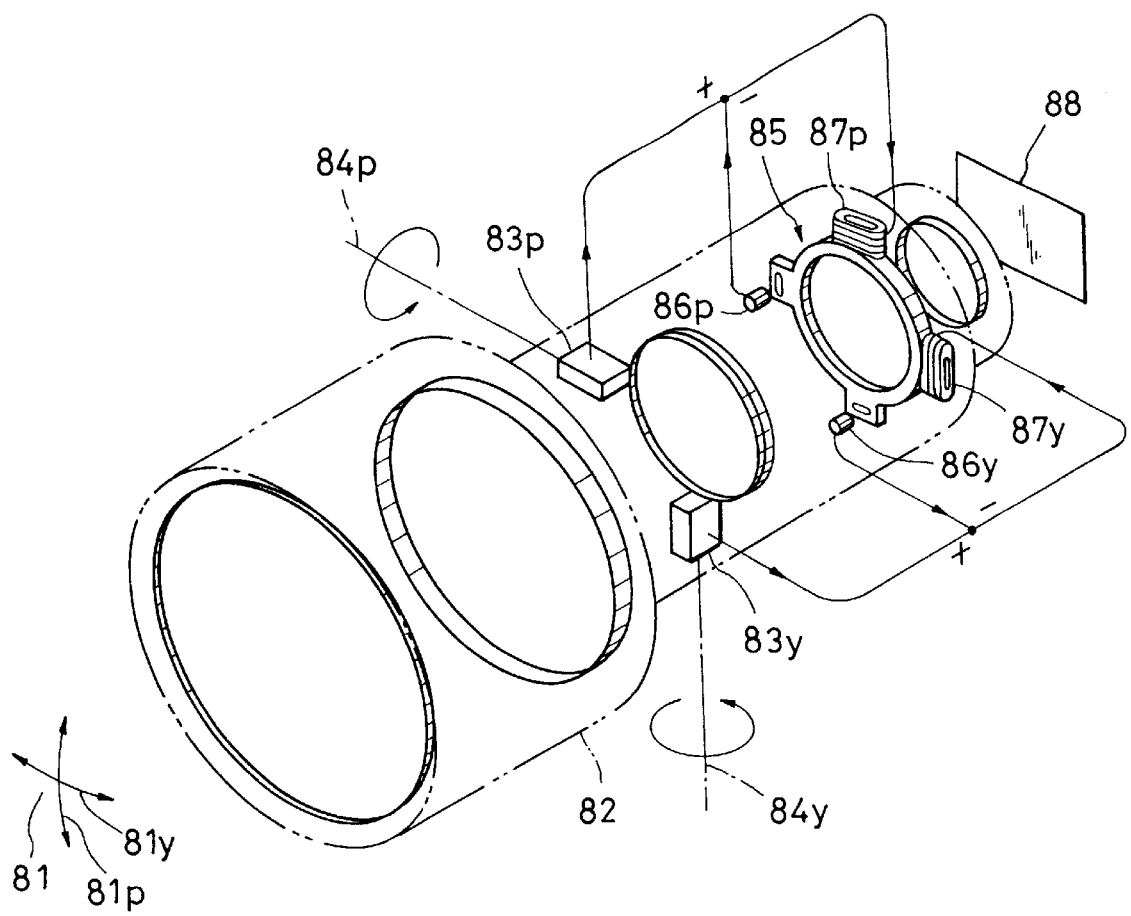
FIG. 8 is a perspective view diagrammatically showing a conventional image stabilization system.

Referring now to a flow diagram shown in FIG. 7, the operation of the third embodiment is discussed. The following discussion focuses on the operation particular to the third embodiment and part of the operation common to the flow diagram shown in FIG. 5 is not discussed.

Step #48 A determination is made of whether a 2-time magnification extender is mounted. When it is determined that no 2-time magnification extender is mounted, the process goes to step #14. When it is determined that a 2-time magnification extender is mounted, the process goes to step #49.

Step #49 Through communication with the camera, the type of the camera connected to the optical lens is determined. In this embodiment, the communication with the camera about camera status discriminates between camera type A and camera type B.

Step #50 It is determined whether the camera is a type A camera or a type B camera. When it is determined that the camera is a type A camera, the process goes to step #14, where image stabilization is performed. When it is determined that the camera is the type B camera, the process goes to step #20, where image stabilization is not performed.

For example, the type A camera may be the one intended for an experienced photographer and the type B camera may be the one intended for a novice photographer. The experienced photographer may identify the seasickness effect and may judge whether the image stabilization function is fully enjoyed. When the seasickness effect takes place, the switch SWIS is turned off, rendering the image stabilization inoperative and setting the camera operation free from the above problem. The experienced photographer who may be used to seeing stabilized images suffers a relatively milder seasickness effect, and photographs with the image stabilization function switched on by turning the switch SWIS on.

The novice photographers may not make the above judgements on their own, and there is a high possibility that they suffer the seasickness effect since they are not used to seeing stabilized images, and it is advisable to disable the image stabilization function.

As described above, when a high-magnification extender is mounted, a decision is made not to perform image stabilization depending on the type of the camera. The image stabilization is performed reflecting the skill level of photographers.

In the third embodiment, the image stabilization function is enabled or disabled depending on the camera. Alternatively, the integration characteristics may be changed depending on the type of the camera in the same way as the first embodiment.

Furthermore, considering the type of the extender mounted on the camera, the integration characteristics may be changed or the image stabilization may be enabled or disabled.

Alternate Embodiments

In each of the above embodiments, the pitch and yaw controls share the same program. Alternatively, both controls may use different programs. The controls are digital controls in the above embodiments. Alternatively, an analogue control may be used.

The image stabilizing unit is installed in the optional lens assembly in the above embodiments. Alternatively, the image stabilizing unit may take the form of an adapter which is inserted between the camera and lens, or which is arranged in a conversion lens attached in front of the optional lens.

The present invention may be incorporated in a camera such as a lens-shutter camera or video camera, and further in optical apparatuses such as binoculars and a unit constituting an optical apparatus.

In the above embodiments, an angular velocity sensor is used as a shake sensor. Alternatively, any other sensor such as an angular acceleration sensor, an acceleration sensor, a velocity sensor, an angular displacement sensor, a displacement sensor, and means for detecting directly image blurring, may be used as long as it detects shake.

The shake sensor means is assembled into the optional lens in the above embodiments. Alternatively, the shake sensor means may be assembled into the camera main unit, and based on a signal from it, a correction lens on the optional lens side may be controlled in position.

According to the above embodiments of the present invention, the optical apparatus with the image stabilization function performs optimum image stabilization control according to the optical characteristics modifying converter mounted thereto.

According to the above embodiments of the present invention, the optional lens performs optimum image stabilization control according to the camera to which the optional lens is attached to and to the optical characteristics modifying converter attached to the optional lens.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera system including a camera having a predetermined operation portion for performing a predetermined operation and an optical assembly having an image stabilizing unit for stabilizing an image in response to an output of a vibration sensor for detecting a shake, the camera system optionally including an optical characteristics modifying converter, the camera system further comprising:

activating means for activating an image stabilization operation by the image stabilizing unit in response to a predetermined operation of the predetermined operation portion of the camera;

determining means for determining whether the camera system includes an optical characteristics modifying converter and, if so, for determining a type of the optical characteristics modifying converter; and decision means for deciding whether to enable the activating means to activate an image stabilization operation based on a determination by the determining means.

2. A camera system according to claim 1, wherein the decision means comprises means for disabling activation of an image stabilization operation by the activating means in response to a determination by the determining means that the camera system includes an optical characteristics modifying converter.

3. A camera system according to claim 2, wherein the determining means includes means for determining whether an optical characteristics modifying converter included in a camera system has an image stabilizable function, and wherein the decision means comprises means for enabling activation of an image stabilization operation by the activating means in response to a determination by the determining means that an optical characteristics modifying converter included in the camera system has an image stabilizable function.

4. A camera system according to claim 3, wherein the determining means comprises means for determining whether the camera system includes a second optical characteristics modifying converter, and wherein the decision means comprises means for enabling activation of an image stabilization operation by the activating means when the determining means determines that the camera system includes a second optical characteristics modifying converter.

5. A camera system according to claim 4, wherein the second optical characteristics modifying converter does not have an image stabilization function.

6. A camera system according to claim 4, wherein each of the first optical characteristics modifying converter and the second optical characteristics modifying converter is an extender.

7. A camera system according to claim 6, wherein the optical characteristics modifying converter is an extender having a higher magnification than the second optical characteristics modifying converter.

8. A camera system according to claim 1, wherein the activating means comprises means for outputting a command signal for activating an image stabilization operation in response to the predetermined operation.

9. A camera system according to claim 8, wherein the decision means comprises means for disabling the activating means from outputting the command signal in response to a determination by the determining means that the camera system includes an optical characteristics modifying converter.

10. A camera system according to claim 1, wherein the predetermined operation portion of the camera is a release operation portion of the camera.

11. A camera system according to claim 10, wherein the release operation portion can perform at least a first step operation and a second step operation, and wherein the activating means comprises means for activating an image stabilization operation in response to a first step operation.

12. A camera system according to claim 11, wherein the second step operation of the release operation portion causes the camera to perform a release operation.

13. A camera system according to claim 11, wherein the first step operation of the release operation portion causes the camera to perform at least one of a photometric operation and a rangefinding operation.

14. A camera system according to claim 1, wherein the activating means comprises means for activating an image stabilization operation in response to an operation for causing the camera to perform at least one of a photometric operation and a rangefinding operation.

15. A camera system according to claim 1, wherein the image stabilizing unit includes means for optically correcting image blur.

16. A camera system according to claim 15, wherein the image stabilizing unit includes means for correcting image blur by deflecting a light beam.

17. A camera system according to claim 15, wherein the image stabilizing unit includes means for correcting image blur which operates in a direction perpendicular to an optical axis.

18. A camera system according to claim 1, wherein the optical assembly is an interchangeable lens.

19. A camera system including a camera and an optical assembly having an image stabilizing unit for stabilizing an image in response to an output of a vibration sensor for detecting a shake, the camera system optionally including an optical characteristics modifying converter, the camera system further comprising:
   determining means for determining whether the camera system includes an optical characteristics modifying converter and, if so, for determining a type of the optical characteristics modifying converter; and
   variable means for modifying frequency characteristics of the image stabilization operation of the image stabilizing unit in response to a determination by the determining means.

20. A camera system according to claim 19, wherein the optical assembly includes a signal processor circuit for cutting a frequency component of a shake signal lower than a predetermined cutoff frequency, and wherein the variable means comprises means for modifying the predetermined cutoff frequency according to the determination by the determining means.

21. A camera system according to claim 20, wherein the variable means comprises means for setting the predetermined cutoff frequency at a first cutoff frequency in response to a determination by the determining means that the camera system does not include an optical characteristics modifying converter, and for setting the predetermined cutoff frequency at a second cutoff frequency, which is higher than the first cutoff frequency, in response to a determination by the determining means that the camera system includes an optical characteristics modifying converter.

22. A camera system according to claim 21, wherein the determining means comprises sensing means for sensing whether the camera system includes a second optical characteristics modifying converter, and
   wherein the variable means comprises means for setting the predetermined cutoff frequency at a cutoff frequency lower than at least the second cutoff frequency when the sensing means senses that the camera system includes a second optical characteristics modifying converter.

23. A camera system according to claim 22, wherein the second optical characteristics modifying converter does not have an image stabilization function.

24. A camera system according to claim 20, wherein the signal processor circuit comprises an integrating circuit.

25. A camera system according to claim 19, wherein the optical characteristics modifying converter does not have an image stabilization function.

26. A camera system according to claim 22, wherein each of the optical characteristics modifying converter and the second optical characteristics modifying converter is an extender.

27. A camera system according to claim 26, wherein the optical characteristics modifying converter is an extender having a higher magnification than the second optical characteristics modifying converter.

28. A camera system according to claim 19, wherein the optical assembly includes means for activating an image stabilization operation in response to a predetermined operation of a predetermined operation portion of the camera.

29. A camera system according to claim 28, wherein the activating means comprises means for activating an image stabilization operation in response to a predetermined operation of a release operation portion of the camera.

30. A camera system according to claim 28, wherein the activating means comprises means for activating an image stabilization operation in response to an operation for causing the camera to perform at least one of a photometric operation and a rangefinding operation.

31. A camera system according to claim 19, wherein the image stabilizing unit includes means for optically correcting image blur.

32. A camera system according to claim 31, wherein the image stabilizing unit includes means for correcting image blur by deflecting a light beam.

33. A camera system according to claim 31, wherein the image stabilizing unit includes means for correcting image blur which operates in a direction perpendicular to an optical axis.

34. A camera system according to claim 19, wherein the optical assembly is an interchangeable lens.

35. A camera system including a camera having a predetermined operation portion for performing a predetermined operation and an optical assembly having an image stabilizing unit for stabilizing an image in response to an output of a vibration sensor for detecting a shake, the camera system optionally including an optical characteristics modifying converter, the camera system further comprising:

a control circuit comprising:
    activating means for activating an image stabilization operation by the image stabilizing unit in response to a predetermined operation of the predetermined operation portion of the camera;
    determining means for determining whether the camera system includes an optical characteristics modifying converter and, if so, for determining a type of the optical characteristics modifying converter; and
    decision means for deciding whether to activate an image stabilization operation of the image stabilizing unit by the activating means based on a determination by the determining means.

36. A camera system including a camera and an optical assembly having an image stabilizing unit for stabilizing an image in response to an output of a vibration sensor for detecting a shake, the camera system optionally including an optical characteristics modifying converter, the camera system further comprising:
    a control circuit comprising:
        determining means for determining whether the camera system includes an optical characteristics modifying converter and, if so, for determining a type of the optical characteristics modifying converter; and
        variable means for modifying frequency characteristics of the image stabilization operation of the image stabilizing unit in response to a determination by the determining means.

37. A camera system according to claim 1, wherein when said determining means determines that the camera system includes an optical characteristics modifying converter, the determining means further determines whether the optical characteristics modifying converter is a first type of optical characteristics modifying converter or a second type of optical characteristics modifying converter, different from the first type of optical characteristics modifying converter.

38. A camera system according to claim 19, wherein when the determining means determines that the camera system includes an optical characteristics modifying converter, the determining means further determines whether the optical characteristics modifying converter is a first type of optical characteristics modifying converter or a second type of optical characteristics modifying converter, different from the first type of optical characteristics modifying converter.

39. A camera system according to claim 35, wherein when the determining means determines that the camera system includes an optical characteristics modifying converter, the determining means further determines whether the optical characteristics modifying converter is a first type of optical characteristics modifying converter or a second type of optical characteristics modifying converter, different from the first type of optical characteristics modifying converter.

40. A camera system according to claim 36, wherein when the determining means determines that the camera system includes an optical characteristics modifying converter, the determining means further determines whether the optical characteristics modifying converter is a first type of optical characteristics modifying converter or a second type of optical characteristics modifying converter, different from the first type of optical characteristics modifying converter.

41. A lens apparatus attachable to and detachable from a camera directly or by interposing an optical characteristics modifying converter which is attachable to and detachable from the camera between the lens apparatus and the camera, wherein the camera has a predetermined operation portion for performing a predetermined operation, the lens apparatus comprising:
    an image stabilizing unit for stabilizing an image in response to an output of a vibration sensor for detecting a shake;
    activating means for activating an image stabilization operation by the image stabilizing unit in response to the predetermined operation of the predetermined operation portion of the camera;
    determining means for determining whether the camera includes an optical characteristics modifying converter and, if so, for determining a type of the optical characteristics modifying converter; and
    decision means for deciding whether to enable the activating means to activate an image stabilization operation based on a determination by the determining means.

42. A lens apparatus according to claim 41, wherein the decision means comprises means for disabling activation of an image stabilization operation by the activating means in response to a determination by the determining means that the camera includes an optical characteristics modifying converter.

43. A lens apparatus according to claim 41, wherein the determining means comprises means for determining the camera includes a second optical characteristics modifying converter, and
    wherein the decision means comprises means for enabling activation of an image stabilization operation by the activating means when the determining means determines that the camera includes a second optical characteristics modifying converter.

44. A lens apparatus according to claim 43, wherein each of the optical characteristics modifying converter and the second optical characteristics modifying converter is an extender.

45. A lens apparatus according to claim 44, wherein the optical characteristics modifying converter is an extender having a higher magnification than the second optical characteristics modifying converter.

46. A lens apparatus attachable to and detachable from a camera directly or by interposing an optical characteristics modifying converter which is attachable to and detachable from the camera between the lens apparatus and the camera, the lens apparatus comprising:
    an image stabilizing unit for stabilizing an image in response to an output of a vibration sensor for detecting a shake;
    determining means for determining whether the camera includes an optical characteristics modifying converter and, if so, for determining a type of the optical characteristics modifying converter; and
    variable means for modifying frequency characteristics of the image stabilization operation of the image stabilizing unit in response to a determination by the determining means.

47. A lens apparatus according to claim 46, wherein the lens apparatus includes a signal processor circuit for cutting a frequency component of a shake signal lower than a predetermined cutoff frequency, and wherein the variable means comprises means for modifying the predetermined cutoff frequency according to the determination by the determining means.

48. A lens apparatus according to claim 47, wherein the variable means comprises means for setting the predetermined cutoff frequency at a first cutoff frequency in response to a determination by the determining means that the camera does not include an optical characteristics modifying converter, and for setting the predetermined cutoff frequency at a second cutoff frequency, which is higher than the first cutoff frequency, in response to a predetermination by the determining means that the camera includes an optical characteristics modifying converter.

49. A lens apparatus according to claim 48, wherein the determining means comprises sensing means for sensing whether the camera includes a second optical characteristics modifying converter, and wherein the variable means comprises means for setting the predetermined cutoff frequency at a cutoff frequency lower than at least the second cutoff frequency when the sensing means senses that the camera includes a second optical characteristics modifying converter.

50. A lens apparatus according to claim 49, wherein each of the optical characteristics modifying converter and the second optical characteristics modifying converter is an extender.

51. A lens apparatus according to claim 50, wherein the optical characteristics modifying converter is an extender having a higher magnification than the second optical characteristics modifying converter.

* * * * *

UNITED STATES PATENT AND TRADEMARK OFFICE
CERTIFICATE OF CORRECTION

PATENT NO. : 6,694,096 B1
DATED : February 17, 2004
INVENTOR(S) : Shinji Imada

It is certified that error appears in the above-identified patent and that said Letters Patent is hereby corrected as shown below:

<u>Title page,</u>
Item [57], ABSTRACT,
Line 8, "a" should be deleted.
Line 14, "a" should read -- the --.

<u>Column 1,</u>
Line 36, "displacement, the like," should read -- displacement and the like, --.
Line 66, "71" should read -- 71a is --.

<u>Column 2,</u>
Line 14, "snapped in" should read -- snapped in in --.
Line 47, "When" should read -- When the --.

<u>Column 12,</u>
Line 22, "IS START" should read -- IS_START --.

<u>Column 15,</u>
Line 66, "attached to" should read -- attached, --.

Signed and Sealed this

Thirteenth Day of July, 2004

JON W. DUDAS
*Acting Director of the United States Patent and Trademark Office*